(12) United States Patent
Wong et al.

(10) Patent No.: US 8,150,399 B2
(45) Date of Patent: Apr. 3, 2012

(54) TECHNIQUES FOR WIRELESS COMMUNICATIONS NETWORKS EMPLOYING BEAMFORMING

(75) Inventors: Wendy C. Wong, San Jose, CA (US); Shilpa Talwar, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 1110 days.

(21) Appl. No.: 11/963,445

(22) Filed: Dec. 21, 2007

(65) Prior Publication Data

US 2010/0020702 A1 Jan. 28, 2010

(51) Int. Cl.
*H04W 36/00* (2009.01)
(52) U.S. Cl. .................... 455/443; 455/63.1; 455/67.13; 455/522; 455/525; 370/310.2; 370/328; 370/329; 370/331
(58) Field of Classification Search .................. 455/63.1, 455/67.13, 522, 525, 443; 370/310.2, 328, 370/329, 331
See application file for complete search history.

(56) References Cited

U.S. PATENT DOCUMENTS

| | | | |
|---|---|---|---|
| 7,395,030 B2 * | 7/2008 | Yoshida et al. | 455/63.1 |
| 7,471,654 B2 * | 12/2008 | Mueckenheim et al. | 370/329 |
| 2008/0165727 A1 * | 7/2008 | Xiaoben et al. | 370/329 |
| 2009/0067375 A1 | 3/2009 | Wong et al. | |
| 2009/0110087 A1 * | 4/2009 | Liu et al. | 375/260 |
| 2009/0130980 A1 * | 5/2009 | Palanki et al. | 455/63.1 |

* cited by examiner

*Primary Examiner* — Dwayne Bost
*Assistant Examiner* — Amancio Gonzalez
(74) *Attorney, Agent, or Firm* — Kacvinsky Daisak, PLLC

(57) ABSTRACT

Techniques involving beamforming are disclosed. For example, For instance an apparatus may select a first mobile station served by a first base station and a second mobile station served by a second base station. Based on this selection, a quality metric may be determined that is based on a strength of a user link and a strength of an interfering link. The user link is associated with service of the first mobile station and the interfering link is associated with service of the second mobile station. When the quality metric is greater than a predetermined threshold, the apparatus may designate the first and second mobile stations as suitable for beamforming service in a same resource allocation. Also, techniques are disclosed for determining whether a mobile station is a cell edge mobile station.

19 Claims, 12 Drawing Sheets

TECHNIQUES FOR WIRELESS COMMUNICATIONS NETWORKS EMPLOYING BEAMFORMING

BACKGROUND

Transmit beamforming with nulling techniques have been considered for wireless networks to increase system performance. For instance, such techniques have been considered for Worldwide Interoperability for Microwave Access (WiMAX) networks and planned WiMAX II networks. More particularly, such techniques have been considered for cell edge users that are stationary or have low mobility.

In interference limited cellular deployments, beamforming with nulling may advantageously attenuate interfering transmissions while boosting power to desired user devices. As a result, signal to interference-plus-noise ratio (SINR) performance may be improved for communications with user devices.

Beamforming techniques may increase system complexity. For instance, the employment of such techniques may involve the identification of cell edge mobile devices, the allocation of communications resources among such mobile devices, and the determination of beamforming weights for such devices.

DETAILED DESCRIPTION

Various embodiments may be generally directed to the application of beamforming in wireless communications systems. For instance, techniques are disclosed that identify mobile stations suitable for beamforming and sharing a resource allocation. Further, techniques are disclosed for determining whether mobile stations are cell edge mobile stations.

Various embodiments may comprise one or more elements. An element may comprise any structure arranged to perform certain operations. Each element may be implemented as hardware, software, or any combination thereof, as desired for a given set of design parameters or performance constraints. Although an embodiment may be described with a limited number of elements in a certain arrangement by way of example, the embodiment may include other combinations of elements in alternate arrangements. It is worthy to note that any reference to "one embodiment" or "an embodiment" means that a particular feature, structure, or characteristic described in connection with the embodiment is included in at least one embodiment. The appearances of the phrases "in one embodiment" or "in an embodiment" in various places in the specification are not necessarily all referring to the same embodiment.

Figure 1:
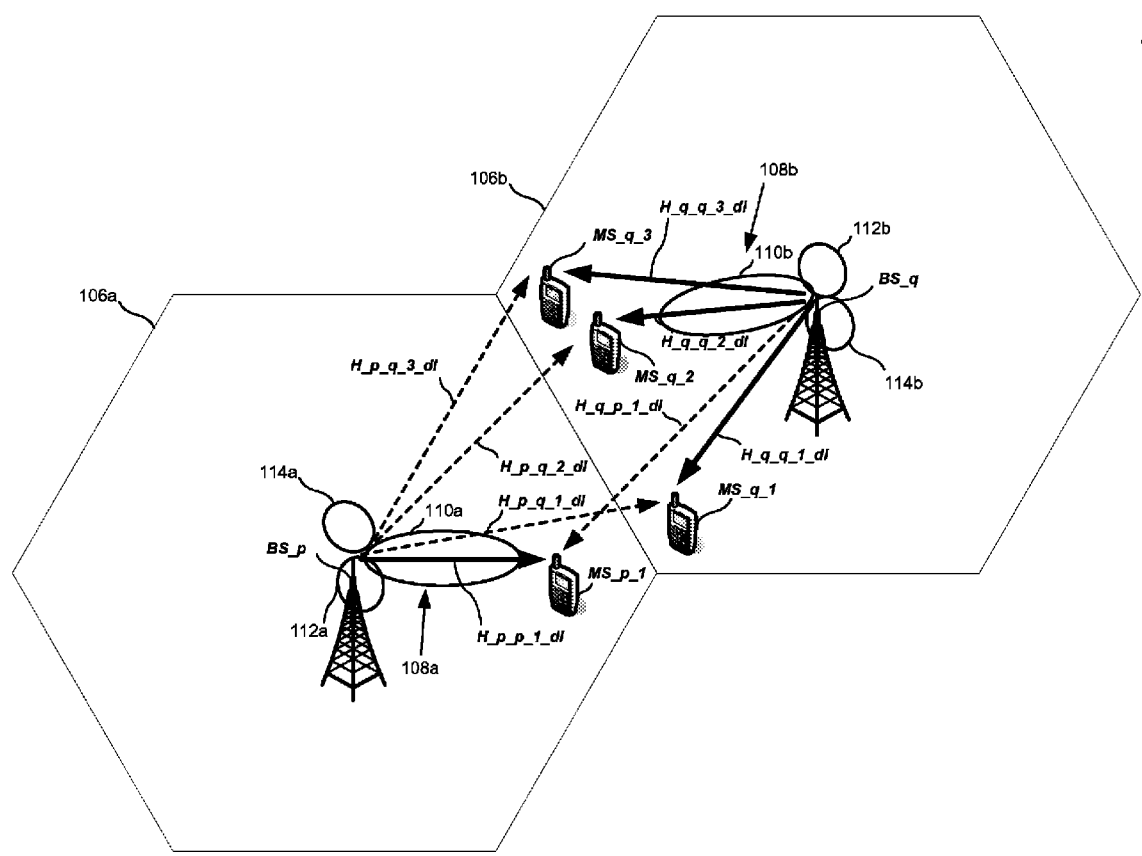
FIG. 1 illustrates an exemplary operational scenario.

FIG. 1 is a diagram of an exemplary operational environment 100. This environment includes base stations BS_p and BS_q. In addition, this environment includes mobile stations MS_p_1, MS_q_1, MS_q_2, and MS_q_3. As shown in FIG. 1, an idealized coverage area (or cell) 106 is associated with each of BS_p and BS_q. More particularly, a coverage area 106a is associated with BS_p and a coverage area 106b is associated with BS_q.

BS_p provides communications service to MS_p_1. In contrast, BS_q provides communications service to MS_q_1, MS_q_2, and MS_q_3. Such service involves the exchange of wireless signals. These wireless signals may be modulated according to orthogonal frequency division multiplexing (OFDM) and/or orthogonal frequency division multiple access (OFDMA) techniques. Accordingly, the base stations and mobile stations of FIG. 1 may operate in an IEEE 802.16 WiMAX system or WiMAX II system. The embodiments, however, are not limited to such modulation techniques or systems.

BS_p and BS_q each include multiple antennas. Through these antennas, each base station employs adaptive transmit beamforming with nulling techniques to improve the strength of signals transmitted to the mobile stations it serves and to attenuate the strength of signals transmitted to mobile stations serviced by other base stations. For instance, FIG. 1 shows that BS_p forms a beam 108a for communications with MS_p_1. Similarly, BS_q forms a beam 108b for communications with MS_q_2.

Each of these beams may include a main lobe and multiple side lobes. For purposes of illustration, FIG. 1 shows beam 108a having a main lobe 110a, a first side lobe 112a, and a second side lobe 114a. Similarly, FIG. 1 shows beam 108b having a main lobe 110b, a first side lobe 112b, and a second side lobe 114b. These beams are shown for purposes of illustration and not limitation. Therefore, other beam patterns may be employed.

In embodiments, base stations employ such adaptive beamforming with nulling techniques for communications with mobile stations that are prone to suffer from interference transmitted by other base stations. Hence, such mobile stations are referred to as "cell edge mobile stations" and are usually (but not always) located near the boundaries of their corresponding cells 106. In the example of FIG. 1, MS_p_1, MS_q_1, MS_q_2, and MS_q_3 are cell edge mobile stations.

In contrast, mobile stations that do not suffer interference from neighboring base stations and are usually located more towards the center of their corresponding cells 106 are referred to as "central mobile stations." Thus, in embodiments, adaptive beamforming with nulling techniques are not performed for communications with central mobile stations.

To provide connectivity, communications resources are allocated to cell edge mobile stations. Particular resource allocations are referred to herein as resource blocks. A resource block may include, for example, one or more time intervals (e.g., symbol durations) and/or one or more frequency intervals (e.g., subchannel(s)). However, other forms of resource blocks may be employed.

Resource blocks may be allocated in various ways. For instance, a base station may allocate a particular resource block to one or more of its cell edge mobile stations. Within this allocated resource (e.g., time slot, frequency slot, and/or the like), the base station may employ downlink transmit beamforming with nulling to provide improved SINR performance (and thus data rates) for the cell edge station. Also, the same resource block may be allocated by multiple base stations. Thus, multiple cell edge mobile stations served by different base stations may receive transmissions within the same resource block.

For example, FIG. 1 shows that BS_p may employ beamforming with nulling techniques such that beam 108a points its main lobe 110a towards MS_p_1 and points a null or significant signal attenuation towards MS_q_2 and MS_q_3. Similarly, FIG. 1 shows that BS_q may employ beamforming techniques such that beam 108b points its main lobe 110b towards MS_q_2 and points a null or significant signal attenuation towards MS_p_1. Such techniques are referred to as adaptive downlink beamforming with nulling. This is because base stations form beam patterns that enhance coverage to mobile stations they serve and diminish coverage to mobile stations that they do not serve. Hence, beamforming with nulling only works if all interfering BSs use it simultaneously.

As a result of these exemplary beamforming characteristics, the same resource block may be used for transmissions to MS_p_1, MS_q_2, and/or MS_q_3. This may advantageously increase the SINR levels of these transmissions. In turn, the data rates associated with these transmissions may also be increased.

The adaptive beamforming example of FIG. 1 is provided for purposes of illustration and not limitation. Thus, BS_p and BS_q may arrange beams differently. Examples of different arrangements are described below with reference to FIGS. 3A and 3B.

Various links or channels may exist between base stations and mobile stations. For example, FIG. 1 shows downlink user channels, which are between base stations and the mobile stations that they serve. Also, FIG. 1 shows downlink interfering channels. These interfering channels are between base stations and mobile stations that they do not serve. The downlink user channels and downlink interfering channels of FIG. 1 are listed below in Tables 1 and 2. Also, these tables provide frequency response notations for these channels.

TABLE 1

| Downlink User Channel | Description | Frequency Response Notation |
|---|---|---|
| H_p_p_1_dl | Downlink user channel from BS_p to MS_p_1 | $H_{p\_p\_1}^{DL}$ |
| H_q_q_1_dl | Downlink user channel from BS_q to mobile station MS_q_1 | $H_{q\_q\_1}^{DL}$ |
| H_q_q_2_dl | Downlink user channel from BS_q to MS_q_2 | $H_{q\_q\_2}^{DL}$ |
| H_q_q_3_dl | Downlink user channel from BS_q to MS_q_3 | $H_{q\_q\_3}^{DL}$ |

TABLE 2

| Downlink Interfering Channel | Description | Frequency Response Notation |
|---|---|---|
| H_p_q_1_dl | Downlink interfering channel from BS_p to MS_q_1 | $H_{p\_q\_1}^{DL}$ |
| H_p_q_2_dl | Downlink interfering channel from BS_p to MS_q_2 | $H_{p\_q\_2}^{DL}$ |
| H_p_q_3_dl | Downlink interfering channel from BS_p to MS_q_3 | $H_{p\_q\_3}^{DL}$ |
| H_q_p_1_dl | Downlink interfering channel from BS_q to MS_p_1 | $H_{q\_p\_1}^{DL}$ |

Figure 2:
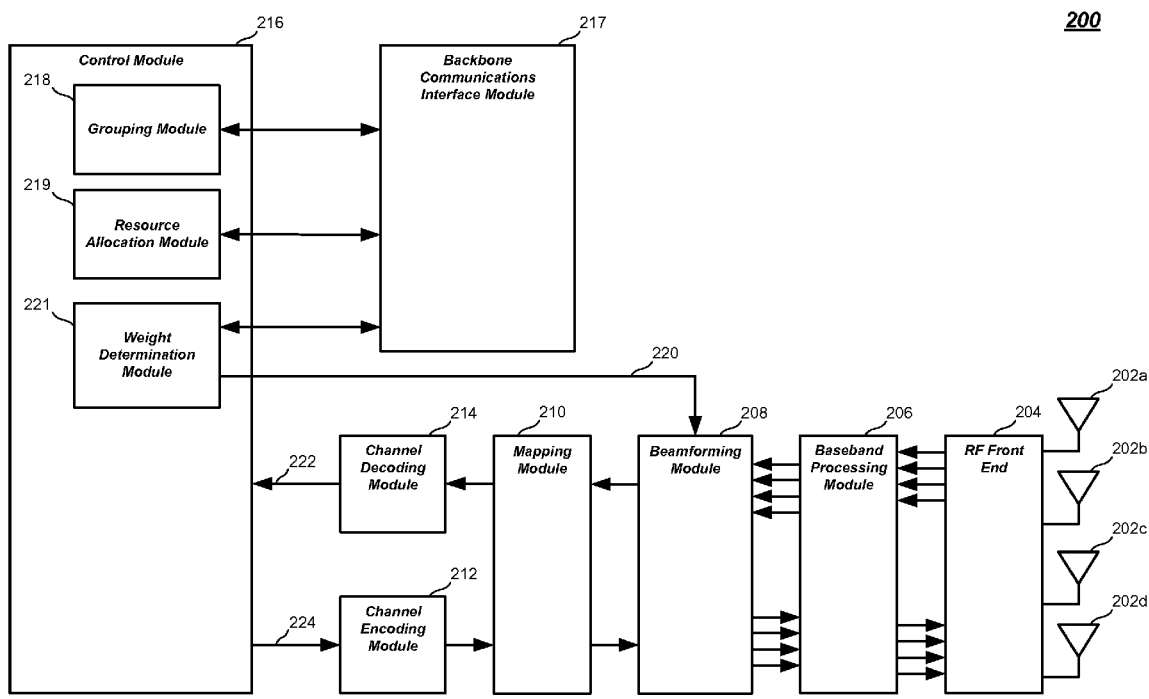
FIG. 2 is a diagram of an exemplary base station.

FIG. 2 is a diagram showing an implementation of an exemplary base station 200. With reference to FIG. 1, this implementation may be employed for base stations BS_p and BS_q. The embodiments, however, are not limited to this implementation.

Base station 200 may include various elements. For instance, FIG. 2 shows base station 200 including antennas 202a-d, a radio frequency (RF) front end 204, a baseband processing module 206, a beamforming module 208, a mapping module 210, a channel encoding module 212, a channel decoding module 214, a control module 216, and a backbone communications interface module 217. These elements may be implemented in hardware, software, firmware, or any combination thereof.

For purposes of illustration (and not limitation), FIG. 2 shows base station 200 including four antennas (202a-d). However, any number of antennas may be employed. Through antennas 202a-d, base station 200 may communicate with one or more mobile stations. Such communications may employ the beamforming techniques described herein.

RF front end 204 exchanges signals between antennas 202a-d and baseband processing module 206. In particular, RF front end 204 prepares modulated signals received from baseband processing module 206 for wireless transmission, and prepares received RF signals for processing (e.g., demodulation) by baseband processing module 206. RF front end 204 may include various components (e.g., electronics) such as amplifiers, filters, upconverters, downconverters, diplexers, and/or circulators. However, the embodiments are not limited to these examples.

Baseband processing module 206 receives weighted signals from beamforming module 208 and modulates these signals. For instance, baseband processing module 206 may receive a weighted signal for each of antennas 202a-d. Upon receipt of these signals, baseband processing module 206 performs modulation operations to generate modulated signals corresponding to each of antennas 202a-d. In addition, baseband processing module 206 may convert these modulated signals from digital signals into analog signals and send them to RF front end 204.

Further, baseband processing module 206 receives multiple analog signals from RF front end 204. Each of these signals corresponds to one of antennas 202a-d. Upon receipt of these signals, baseband processing module 206 converts these signals to digital signals and demodulates them.

In embodiments, the modulation and demodulation operations performed by baseband processing module 206 may be in accordance with OFDM or OFDMA techniques. Thus, modulation operations may involve Inverse Fast Fourier Transforms (IFFTs), while demodulation operations may involve Fast Fourier Transforms (FFTs).

Beamforming module 208 may apply a set of weights to signals that are for transmission by base station 200. For instance, beamforming module 208 may apply a set of weights to a signal received from mapping module 210. As a result, beamforming module 208 produces a weighted signal for each of antennas 202a-d. These weighted signals are sent to baseband processing module 206 for processing, as described above.

FIG. 2 shows that the weights applied by beamforming module 208 are received (as beamforming weights 220) from control module 216. For OFDM/OFDMA type systems, these weights comprise a set of weights for each of antennas 202a-d. Each set of weights includes a weight for each subcarrier used at the corresponding antenna. These weights may each be a complex value (i.e., having a magnitude and a phase).

Accordingly, for each set of weights, each subcarrier value for a signal received from mapping module 210 is multiplied by the corresponding subcarrier weight. This results in a weighted signal for each of antennas 202a-d. As described above, these weighted signals are sent to baseband processing module 206. Thus, in embodiments, beamforming is performed in the frequency domain. However, equivalent time domain operations (which correspond to such frequency domain beamforming operations) may be employed as well. Thus, embodiments may employ beamforming in the frequency domain and/or the time domain.

Further, embodiments may additionally or alternatively perform receive beamforming with nulling. This may involve multiplying signals received from baseband processing module 206 (e.g., a signal for each of antennas 202a-d) by their corresponding weights. As described above, this may involve multiplying subcarrier values with corresponding subcarrier weights. The results of the multiplications for each set of weights may be combined (e.g., summed) to produce a combined signal that is sent to mapping module 210 for further processing.

In embodiments, base station 200 may communicate with cell edge mobile stations in multiple resource blocks. In such cases, communications in each resource block may employ a corresponding set of beamforming weights. As described above, such multiple sets of weights may be received from control module 216 as beamforming weights 220.

Mapping module 210 receives bits from channel encoding module 212 and maps them to particular subcarriers. This produces a mapped signal (e.g., a mapped quadrature amplitude modulation (QAM) signal or a mapped phase shift keying (PSK) signal), which is sent to beamforming module 208 for processing, as described herein.

In addition to conveying information that is received from channel encoding module 212, the signal generated by mapping module 210 may also include beamforming pilots. These beamforming pilots are employed by mobile stations to assess wireless channel characteristics. As described herein, beamforming pilots may comprise predetermined values for one or more predetermined subcarriers. These subcarriers may be distributed over frequency as well as over time.

Further, mapping module 210 receives a combined signal from beamforming module 208 and converts the combined signal into soft bits or symbols. These soft bits or symbols are sent to channel decoding module 214.

Channel encoding module 212 receives an information sequence 224 (e.g., payload data and/or control information) from control module 216. In turn, channel encoding module 212 performs various operations on this sequence. Such operations include randomizing, forward error correction (FEC) encoding, and/or interleaving operations. In turn, channel encoding module 212 provides an encoded signal to mapping module 210 for processing, as described herein.

Channel decoding module 214 may receive soft symbols or bits from mapping module 210. Upon receipt, channel decoding module 214 may perform operations, such as deinterleaving, FEC decoding, and/or de-randomization. Through such operations, channel decoding module 214 produces a received information sequence 222.

FIG. 2 shows that received information sequence 222 is sent to control module 216. Received information sequence 222 may include data and control information. Such control information may include channel quality indicator (CQI) messages generated and sent by mobile stations.

Backbone communications interface module 217 provides for the exchange of information with other base stations. This information may include information regarding characteristics of interfering downlink channels, as described herein. This information may also include identifiers of cell edge mobile stations (e.g., locally served and/or remotely served cell edge mobile stations), beamforming weights employed by mobile stations, mobile station groupings, and/or resource allocation information. The embodiments, however, are not limited to these examples. This exchange of information among base stations may occur across wired or wireless networks. Moreover, base stations may exchange such information through various network and/or system entities.

Accordingly, backbone communications interface module 217 may include elements, such as network interface cards, electronics, and/or other elements to provide such communications capabilities. These elements may be implemented in hardware, software, firmware, or any combination thereof FIG. 2 shows that control module 216 is coupled to backbone communications interface module 217, channel encoding module 212, and channel decoding module 214.

Control module 216 may send and receive information that is exchanged with mobile stations. For example, control module 216 may send and receive payload information (e.g., voice traffic and data). Also, control module 216 may receive channel quality indicator (CQI) messages that are sent by mobile stations. Further, control module 216 may receive information from mobile stations regarding the beamforming weights that they apply in receiving and/or sending transmissions. The embodiments, however, are not limited to these examples.

Accordingly, control module 216 may include components and/or functionality to operate according to one or more protocol layers. Such protocol layers may provide features, such as packet encapsulation/decapsulation, error correction encoding/decoding, signaling, link protocols, and/or media access protocols. However, control module 216 may include other components and/or functionality. Control module 216 may exchange information (e.g., payload data) with higher level protocols and/or application entities (not shown).

FIG. 2 shows that control module 216 includes a grouping module 218, a resource allocation module 219, and a weight determination module 221. Each of these modules may exchange information with mobile stations served by base station 200. Also, each of these modules may exchange information with remote base stations via backbone communications interface 217.

Grouping module 218 identifies cell edge mobile stations served by different base stations that are suitable for sharing resource block allocations. More particularly, for each cell edge mobile station served by base station 200, grouping module 219 may identify one or more (if any) cell edge mobile stations served by other base stations that are suitable for sharing resource block allocations. Such identifications are also referred to herein as groupings.

The groupings identified by grouping module 218 may be based on information sent by mobile stations that base station 200 serves for FDD systems or based on channel measurements performed by base station 200 for TDD systems, as well as on information received from other base stations via backbone communications interface 217. For example, in embodiments, grouping module 218 may perform group procedures, such as the procedure described below with reference to FIG. 6. The embodiment, however, are not limited to these examples.

Resource allocation module 219 assigns each cell edge mobile station served by base station 200 to a resource block. Such assignments may be based on groupings identified by grouping module 218. In addition, such assignments may be based on groupings and/or resource allocations generated by other base stations. Accordingly, resource allocation module 219 may exchange grouping and/or resource allocation information from remote base stations via backbone communications interface 217. Weight determination module 221 generates beamforming weights 220, which are sent to beamforming module 208. This generation is based on information sent by mobile stations served by base station 200, as well as on information received from other base stations via backbone communications interface 217 for FDD systems. Such information may include CQI messages received from mobile stations that include user channel and/or interfering channel measurements. Also, such information may include interfering channel measurements performed by remotely served mobile stations that are received via backbone communications interface 217. The embodiments, however, are not limited to these examples. For TDD systems, the beamforming weight calculations are derived from uplink received signals without channel information sent by mobile stations and does not need any backbone information exchange.

In embodiments, weight determination module 221 generates a set of beamforming weights for each resource block that base station 200 employs in communicating with its cell edge mobile stations. Thus, determining a particular set of beamforming weights may consider cell edge mobile stations (locally served and/or remotely served) that are assigned to the corresponding resource block.

Weight determination module 221 determines beamforming weights (e.g., weights 220) for the mobile stations serviced by base station 200. In embodiments, these mobile stations are cell edge stations. These determinations are based on characteristics of various wireless channels. Such determinations may employ the techniques of Equations (3) and (4) or Equations (6) and (7) below. The embodiments, however, are not limited to these equations or techniques.

In general operation, weight determination module 221 may generate weights 220 based on downlink channel characteristics. When base station 200 employs time division duplexing (TDD) techniques, such downlink channel characteristics may be determined from uplink transmissions sent by cell edge mobile stations served by base station 200 and from uplink transmissions sent by interfering cell edge mobile stations served by other (nearby) base stations. These uplink transmissions may be used because TDD systems employ the same frequencies for uplink and downlink transmissions. Thus, in TDD systems, uplink channel properties resemble properties of the corresponding downlink channels.

However, when base station 200 employs frequency division duplexing (FDD) techniques, such downlink channel characteristics cannot be determined from uplink transmissions. This is because uplink and downlink channels are no longer reciprocal due to a substantial frequency separation between these channels.

Thus, weight determination module 221 may determine beamforming weights based on downlink user channel information and downlink interfering channel information that is reported by mobile stations and other base stations. More particularly, weight determination module 221 may generate weights 220 based on CQI messages received from baseband channel decoding module 214 and interfering channel information provided by remote base stations.

During operation, control module 216 receives channel quality indicator (CQI) messages from demodulation module 214 and provides them to weight determination module 221. Such CQI messages are sent by mobile stations served by base station 200. CQI messages may include downlink user channel information, such as frequency response characteristics. Also, in embodiments (e.g., embodiments employing FDD), CQI messages may include downlink interfering channel information, such as frequency response characteristics.

Also, control module 216 may receive further information from mobile stations served by base station 200. Such information may include messages from mobile stations claiming cell edge status, as well as messages providing beamforming weights employed by mobile stations. Such messages may be in the form of signaling and/or CQI messages. The embodiments, however, are no limited to these examples.

Such information received from mobile devices may be sent to backbone communications interface 217 for forwarding to associated remote (e.g., neighboring or nearby) base stations, as described herein.

As described above, the elements of base station 200 may be implemented in hardware, software, firmware, or any combination thereof. Thus, implementations may include one or more processors that execute instructions or control logic stored in a storage medium (e.g., memory). These instructions or control logic may provide features of one or more of the elements of base station 200. The embodiments, however, are not limited to such implementations.

Such storage media may be implemented in various ways. For example, such storage media may include read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, or any other type of media suitable for storing information. The embodiments are not limited in this context.

The employment of transmit beamforming with nulling for downlink transmissions provides improved system performance. For instance, analysis and simulations indicate that such techniques provide significant improvements in spectral efficiency.

An example of weight calculation for TDD systems is now described. In a TDD system, the weights that a base station uses for downlink beamforming may be derived from uplink transmissions that the base station receives from mobile stations. More particularly, the base station may determine weights based on characteristics of channels from its mobile stations to the base station, as well as on characteristics of channels from interfering mobile stations that are served by other (e.g., nearby or neighboring) base stations.

Thus, referring again to FIG. 1, BS_p may determine its beamforming weights based on characteristics of its uplink channel with MS_p_1, as well as on characteristics of its uplink channels with one or more interfering edge mobile stations that are assigned to the same resource block as MS_p_1 (e.g., one or more of MS_q_1, MS_q_2, and MS_q_3).

The following paragraphs provide a quantitative analysis of such determinations in the context of OFDMA systems. Such analysis, however, may be applied or adapted to other types of systems.

This analysis involves a local base station BS_p having M antennas that serves one or more mobile stations MS_p_m (where m is an integer index used for identifying each of these mobile station(s)). Also, the analysis involves one or more remote (e.g., interfering) base stations BS_q (where q is an integer index used for identifying each of the remote base station(s)). Each BS_q may serve one or more mobile stations MS_q_n (where n is an integer index used for identifying each of these mobile station(s)).

The uplink signal that base station BS_p (with M antennas) receives from mobile station MS_p_m (with N antennas) is expressed below in Equation (1).

$$\vec{x}(k) = H_{p\_p\_m}(k)\vec{W}_{MS\_p\_m\_UL}^H s_{p\_m}(k) + \sum_{\substack{q=1, n=1 \\ p \neq q}}^{Q, J} H_{p\_q\_n}(k)\vec{W}_{MS\_q\_n\_UL}^H s_{q\_n}(k) + \vec{n}(k) \quad (1)$$

where:

k=subcarrier number in OFDMA symbol;

$\vec{x}(k)$=received vector (having a dimension M×1) at BS_p on subcarrier k;

$s_{p\_m}(k)$=QAM symbol transmitted by desired user MS_p_m;

$H_{p\_p\_m}(k)$=uplink channel frequency response matrix (having dimensions M×N) from user MS_p_m to desired base station BS_p at subcarrier k (if there is power boosting applied to the signal, the boosting power is part of the channel frequency response);

$\vec{W}_{MS\_p\_m\_UL}(k)$=mobile station beamforming weight at subcarrier k applied by MS_p_m (having dimensions 1×N);

$s_{q\_n}(k)$=QAM symbol of interfering mobile station MS_q_n;

$H_{p\_q\_n}(k)$=channel frequency response matrix (having dimensions M×N) from interfering mobile station MS_q_n to BS_p at subcarrier k;

$\vec{W}_{MS\_q\_n\_UL}$=MS transmit beamforming weight applied by MS_q_n (having dimensions 1×N); and $\vec{n}(k)$=thermal noise vector (having dimensions M×1) at subcarrier k with mean 0 and variance $\sigma^2 I$ (this parameter can be estimated from the base station receiver noise figure or can be measured by base station BS_p, if desired).

In Equation (1), the uplink mobile station beamforming weights ($\vec{W}_{MS\_p\_m\_UL}$) are known to base station BS_p. The base station may determine these weights through a variety of techniques, such as channel precoding used in multiple-input multiple-output (MIMO) systems. The mobile station may determine the precoding weights from its downlink channel measurement. However, the mobile station beamforming weights may be calculated using other techniques as well. The serving base station shall inform the cell edge mobile station which beamforming mode it shall use to calculate its beamforming weights.

The channels of desired and interfering users may be considered constant across a resource block. Hence, for purposes of clarity, the following analysis omits subcarrier index k.

For uplink transmissions, a receive beamformer at base station BS_p employs a weight vector $\vec{w}_{p\_m}$. This weight factor combines the signals received at M antennas, as indicated below in Equation (2).

$$\hat{s}_{p\_m} = \vec{w}_{p\_m}^H \vec{x} \quad (2)$$

$$= \vec{w}_{p\_m}^H (H_{p\_p\_m}) \vec{W}_{MS\_p\_m\_UL}^H s_{p\_m} + \sum_{\substack{q=1, n=1 \\ p \neq q}}^{Q, J} \vec{w}_{p\_m}^H (H_{p\_q\_n}) \vec{W}_{MS\_q\_n\_UL}^H s_{q\_n} + \vec{w}_{p\_m}^H \vec{n}$$

In Equation (2), $(.)^H$ denotes a complex conjugate transpose. The weight vector $\vec{w}_{p\_m}$ of Equation (2) may be derived using minimum mean-square error estimation (MMSE), as shown below in Equation (3).

$$\vec{w}_{p\_m} = R_{xx}^{-1} H_{p\_p\_m} \vec{W}_{MS\_p\_m\_UL}^H \quad (3)$$

In Equation (3), $R_{xx} = E(\vec{x}\vec{x}^H)$. $R_{xx}$ may be calculated (assuming that the data and noise are uncorrelated) using Equation (4), below.

$$R_{xx} = \sigma_{s\_p\_m}^2 H_{p\_p\_m} \vec{W}_{MS\_p\_m\_UL}^H \vec{W}_{MS\_p\_m\_UL} H_{p\_p\_m}^H + \sigma_{s\_q\_n}^2 \sum_{\substack{q=1, n=1 \\ p \neq q}}^{Q, J} H_{p\_q\_n} \vec{W}_{MS\_q\_n\_UL}^H \vec{W}_{MS\_q\_n\_UL} H_{p\_p\_n}^H + \sigma^2 I \quad (4)$$

In Equation (4), $\sigma_{s\_p\_m}^2$ and $\sigma_{s\_q\_n}$ represent the average signal powers, which are known.

In turn, $\vec{w}_{p\_m}$ is applied to a downlink transmitted signal, which is expressed below in Equation (5) as $\vec{z}_{p\_m}$.

$$\vec{z}_{p\_m} = \frac{\vec{w}_{p\_m}^H}{|\vec{w}_{p\_m}|} s_{p\_m} \quad (5)$$

The above analysis indicates that downlink beamforming weights (e.g., $\vec{w}_{p\_m}$) may be calculated based on received uplink signals. Such techniques may be employed, for example, in TDD systems. This is because, in such systems, the frequency response of an uplink channel indicates the frequency response of the corresponding downlink channel. More particularly, the frequency response of an uplink channel is the transpose of the corresponding downlink channel in a TDD system. This property may be expressed as $H_{p\_p\_m}^{DL} = (H_{p\_p\_m})^T$ and $H_{p\_q\_n}^{DL} = (H_{p\_q\_n})^T$.

However, this determination of beamforming weights based on uplink transmissions does not apply to FDD systems. This is because a substantial separation typically exists between downlink and uplink frequencies. As a result, downlink and uplink channels exhibit very different channel states. Thus, in FDD systems, $H_{p\_p\_m}^{DL} \neq (H_{p\_p\_m})^T$ and $H_{p\_q\_n}^{DL} \neq (H_{p\_q\_n})^T$.

Accordingly, embodiments (such as ones employing FDD) may adapt Equations (3) and (4) to determine beamforming weights based on downlink channel characteristics. This adaptation is expressed below in Equations (6) and (7).

$$\vec{w}_{p\_m} = R_{xx}^{-1} (H_{p\_p\_m}^{DL})^T \vec{W}_{MS\_p\_m\_UL}^H \quad (6)$$

$$R_{xx} = \sigma_{s\_p\_m}^2 (H_{p\_p\_m}^{DL})^T \vec{W}_{MS\_p\_m\_UL}^H \vec{W}_{MS\_p\_m\_UL} (H_{p\_p\_m}^{DL})^* + \sigma_{s\_q\_n}^2 \sum_{\substack{q=1, n=1 \\ p \neq q}}^{Q, J} (H_{p\_q\_n}^{DL})^T \vec{W}_{MS\_q\_n\_UL}^H \vec{W}_{MS\_q\_n\_UL} (H_{p\_q\_n}^{DL})^* + \sigma^2 I \quad (7)$$

In Equations (6) and (7), $(.)^*$ denotes complex conjugate operation and $\vec{W}_{MS\_p\_m\_UL}$ is the MS beamforming weight applied at MS_p_m that is derived from the downlink channel and is known to BS_p.

Accordingly, embodiments may exchange information among stations to provide base stations with downlink channel characteristics. Further, embodiments may employ various signal formats and/or messages to facilitate this exchange of information. Such exchanged information may include channel quality indicators (CQIs) generated by mobile stations. CQIs provide information regarding downlink channel characteristics from the perspective of the mobile stations.

Current WiMAX CQIs only provide for the feedback of user channel information from mobile stations to their serving base stations. Thus, referring to Equation (7), such user channel information corresponds to $H_{p\_p\_m}^{DL}$. Unfortunately, such CQIs do not provide base stations with characteristics of interfering channels ($H_{p\_q\_n}^{DL}$) Thus, such CQIs merely provide base stations with information corresponding to the first term of Equation (7).

In embodiments, each mobile station measures downlink user channel characteristics. Additionally, each mobile station measures downlink interfering channel characteristics from all interfering base stations (from base stations that it can "hear"). For example, mobile station MS_p_m measures $H_{p\_p\_m}^{DL}$ and $H_{q\_p\_m}^{DL}$.

For FDD systems, each mobile station will then report ("feedback") some form of these measurements to its serving base station. As an example, mobile station MS_p_m will report $H_{p\_p\_m}^{DL}$ and $H_{q\_p\_m}^{DL}$ to base station BS_p.

For FDD systems, each serving base station will then exchange received interfering channel measurements with its fellow base stations. For example, a serving base station (BS_p) may forward $H_{q\_p\_m}^{DL}$ and $H_{r\_p\_m}^{DL}$ information measured by its mobile station MS_p_m to the corresponding interfering base station(s) (e.g., BS_q and BS_r). This feature is described below in greater detail with reference to FIG. 4.

Thus, for FDD systems, each base station will collect interfering channel information measured by mobile stations that are served by other base stations via backbone information exchange. For instance, in the context of Equations (6) and (7), BS_p may receive $H_{q\_p\_m}^{DL}$ information that was measured by mobile station MS_p_m. The $H_{q\_p\_m}^{DL}$ information indicates the forward link interference that BS_q delivers to mobile station MS_p_m.

For TDD systems, no CQI feedback is needed from cell edge mobile stations and no backhaul (or backbone) communication between BSs is needed for beamforming weight calculation at each base station. Hence, TDD systems are more efficient and better suited to employ beamforming with nulling techniques.

Embodiments determine mobile stations (e.g., cell edge mobile stations) that are suited for receiving transmissions within a resource block. This may involve base stations identifying set(s) of one or more mobile stations. Such sets may include mobile stations served by different base stations.

The determination of mobile station sets may be performed by multiple base stations. For instance, base stations that can interfere with each others' mobile stations (also referred to herein as interfering base stations) may operate together to identify such sets. As described above, each identified set includes one or more mobile stations that are suited for receiving beamforming transmissions within the same resource block.

Grouping determinations may be directed at reducing SINRs at mobile stations. This reduction is addressed in the following analysis.

As described above, a serving base station (BS_p) transmits a signal $\vec{z}$ towards a desired cell edge mobile station (MS_p_m). This signal is expressed above in Equation (5) as $$\vec{z}_{p\_m} = \frac{\vec{w}_{p\_m}^H}{\|\vec{w}_{p\_m}\|} s_{p\_m}.$$

In turn, the received signal at the desired cell edge mobile station (MS_p_m) is expressed below in Equation (9).

$$\hat{s} = \vec{W}_{MS\_p\_m\_DL}^H H_{p\_p\_m}^{DL} \vec{z}_{p\_m}^T + \qquad (9)$$

$$\vec{W}_{MS\_p\_m\_DL}^H H_{q\_p\_m}^{DL} \left( \sum_{\substack{q=1,\\ p\neq q}}^{Q} \sum_{n=1}^{J} \vec{z}_{q\_n} \right)^T + \vec{W}_{MS\_p\_m\_DL}^H \vec{n}$$

A further expression of this received signal is provided below in Equation (10).

$$\hat{s} = \vec{W}_{MS\_p\_m\_DL}^H H_{p\_p\_m}^{DL} \left( \frac{\vec{w}_{p\_m}^H}{\|\vec{w}_{p\_m}\|} s_{p\_m} \right)^T + \qquad (10)$$

$$\vec{W}_{MS\_p\_m\_DL}^H H_{q\_p\_m}^{DL} \left( \sum_{\substack{q=1\\ q\neq p}}^{Q} \sum_{n=1}^{J} \frac{\vec{w}_{q\_n}^H}{\|\vec{w}_{q\_n}\|} s_{q\_n} \right)^T + \vec{W}_{MS\_p\_m\_DL}^H \vec{n}$$

Based on the above expressions, the post-processing SINR at MS_p_m is expressed in Equation (11).

$$SINR = \frac{\left\| \vec{W}_{MS\_p\_m\_DL}^H H_{p\_p\_m}^{DL} \left( \frac{\vec{w}_{p\_m}^H}{\|\vec{w}_{p\_m}\|} \right)^T \right\|^2 \delta_{s\_p\_m}^2}{\left\| \vec{W}_{MS\_p\_m\_DL}^H H_{q\_p\_m}^{DL} \left( \sum_{\substack{q=1\\ p\neq q}}^{Q} \sum_{n=1}^{J} \frac{\vec{w}_{q\_n}^H}{\|\vec{w}_{q\_n}\|} \right)^T \right\|^2 \delta_{s\_q\_n}^2 + \|\vec{W}_{MS\_p\_m\_DL}^H\|^2 \delta_n^2} \qquad (11)$$

where:

$$\frac{\vec{w}_{q\_n}^H}{\|\vec{w}_{q\_n}\|}$$

is the transmit beamforming weight of an interfering BS_q transmitting to one of its cell edge mobile stations (MS_q_n); and $H_{q\_p\_m}$ is the channel response between the interfering BS q and the desired cell edge mobile station (MS_p_m).

The denominator of Equation (11) includes the term provided below in Expression (12).

$$\left\| \vec{W}_{MS\_p\_m\_DL}^H H_{q\_p\_m}^{DL} \left( \sum_{\substack{q=1\\ p\neq q}}^{Q} \sum_{n=1}^{J} \frac{\vec{w}_{q\_n}^H}{\vec{w}_{q\_n}} \right)^T \right\|^2 \delta_{s\_q\_n}^2 \qquad (12)$$

In an interference limited system, the term of Expression (12) typically exceeds the noise term $\delta_n^2$. Thus, embodiments may employ a grouping algorithm that groups cell edge mobile stations from adjacent interfering cells to yield high signal to interference ratio (SIR) values, as expressed below in Equation (13).

$$SIR = \frac{\left\| \vec{w}_{MS\_p\_m\_DL}^H H_{p\_p\_m}^{DL} \left( \frac{\vec{w}_{p\_m}^H}{\|\vec{w}_{p\_m}\|} \right)^T \right\|^2 \delta_{s\_p\_m}^2}{\left\| \vec{w}_{MS\_p\_m\_DL}^H H_{q\_p\_m}^{DL} \left( \frac{\vec{w}_{q\_n}^H}{\|\vec{w}_{q\_n}\|} \right)^T \right\|^2 \delta_{s\_q\_n}^2} \quad (13)$$

It is evident from Equation (13) that obtaining high SIR values will result in a low magnitude for the denominator term of Equation (12). Accordingly, obtaining high SIR values will provide for enhanced SINR values.

Figure 3A:
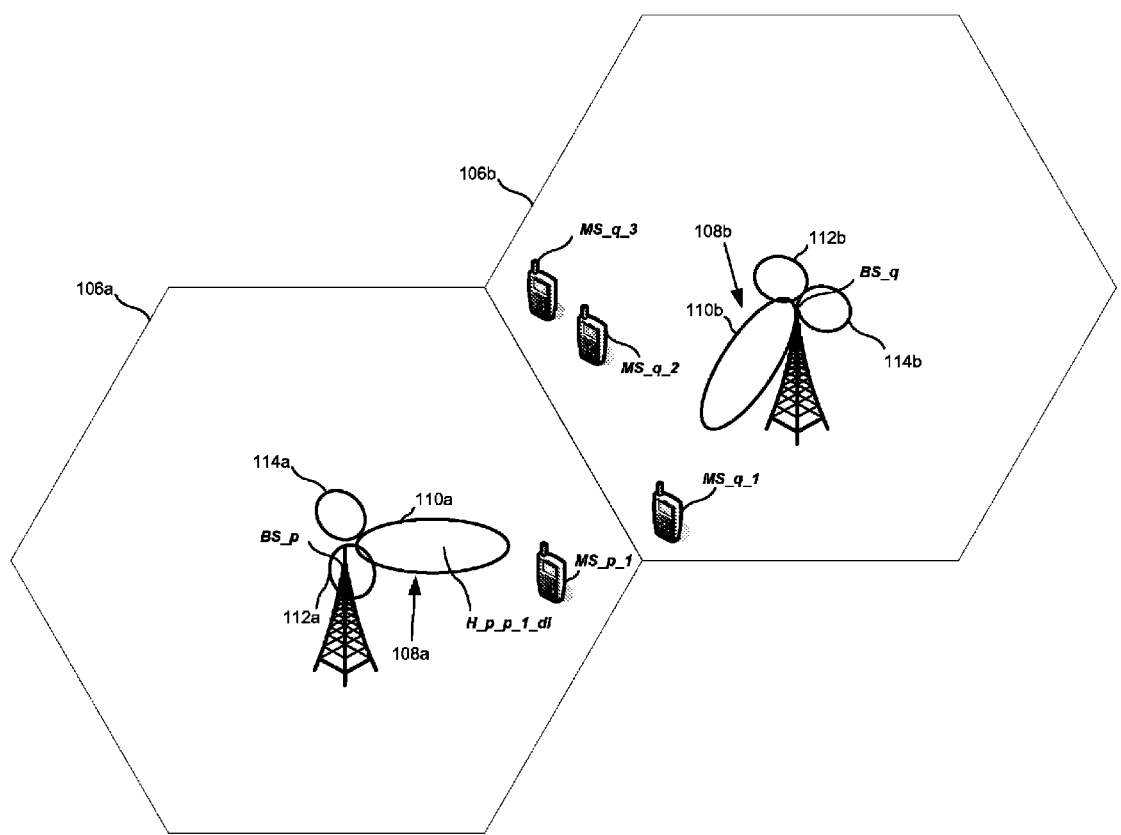
FIGS. 3A and 3B illustrate exemplary mobile station groupings.
Figure 3B:
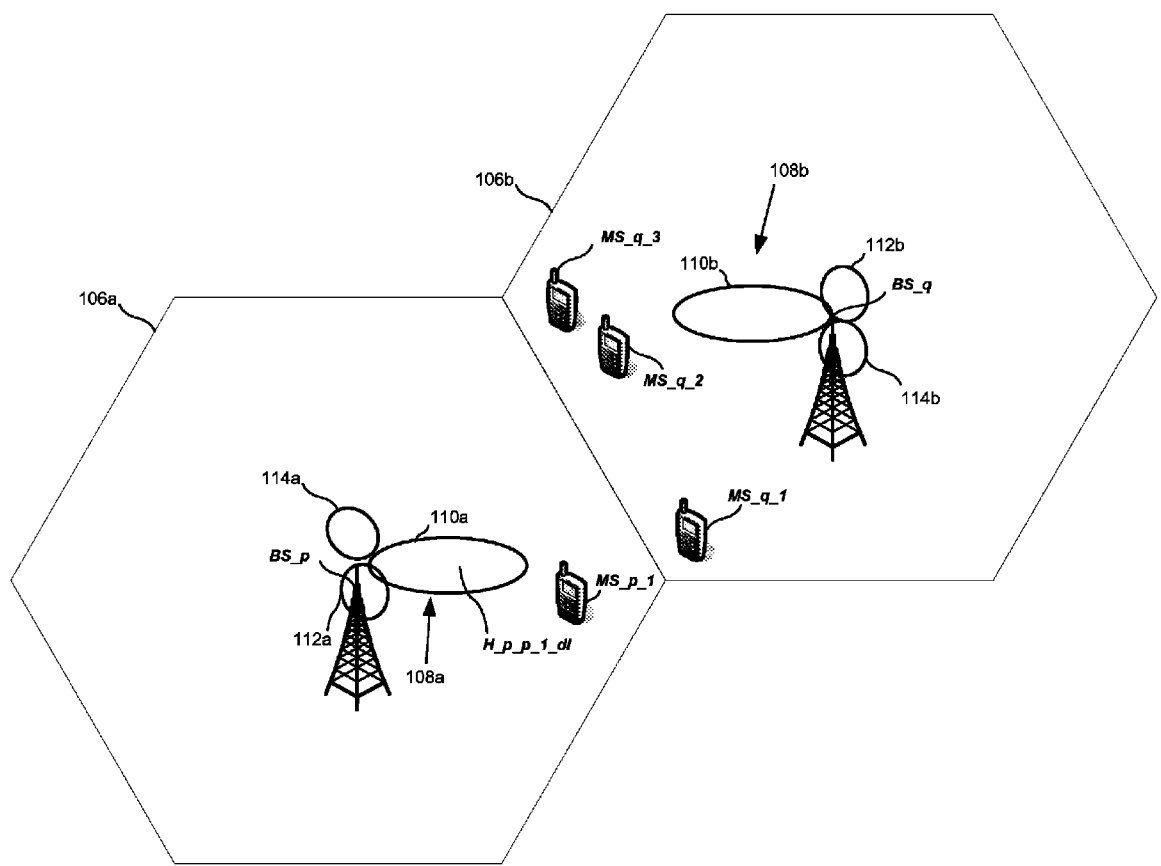

FIGS. 3A and 3B are diagrams illustrating exemplary groupings of cell edge mobile stations for a particular resource block. Thus, each of these diagrams shows a beamforming arrangement. These groupings are based on the operational scenario of FIG. 1. Therefore, in these diagrams, BS_p serves MS_p_1, while BS_q can serve MS_q_1, MS_q_2, or MS_q_3.

In FIG. 3A, MS_p_1 and MS_q_1 are grouped together. Thus, FIG. 3A shows that the main lobe 110a of beam 108a is directed to MS_p_1, while the main lobe 110b of beam 108b is directed to MS_q_1.

An inspection of FIG. 3A indicates that the grouping of FIG. 3A is ineffective. This is because MS_q_1 lies in main lobe 110a of beam 108a (which BS_p directs towards MS_p_1). Also, MS_p_1 lies in the main lobe 110b of beam 108b (which BS_q directs towards MS_q_1).

The interference generated by BS_q at MS_p_1 is expressed below in Equation (14). Also, the interference generated by BS_p at MS_q_1 is expressed below in Equation (15). For the grouping of FIG. 3A, the interference level experienced at MS_p_1 in Equation (14) and the interference level experienced at MS_q_1 in Equation (15) are high.

$$\left\| \vec{w}_{MS\_p\_1\_DL}^H H_{q\_p\_1}^{DL} \left( \frac{\vec{w}_{q\_1}^H}{\|\vec{w}_{q\_1}\|} \right)^T \right\|^2 \delta_{s\_q\_1}^2 \quad (14)$$

$$\left\| \vec{w}_{MS\_q\_1\_DL}^H H_{p\_q\_1}^{DL} \left( \frac{\vec{w}_{p\_1}^H}{\|\vec{w}_{p\_1}\|} \right)^T \right\|^2 \delta_{s\_p\_1}^2 \quad (15)$$

In contrast, FIG. 3B depicts MS_p_1 being grouped with MS_q_2 or MS_q_3. Thus, FIG. 3B shows that the main lobe 110a of beam 108a is directed to MS_p_1, while the main lobe 110b of beam 108b is directed to MS_q_2.

The grouping of FIG. 3B is more effective. This is because BS_p can direct a main lobe 110a of beam 108a towards MS_p_1 while directing a null towards MS_q_2. Also, BS_q can direct main lobe 110b of beam 108b towards MS_q_2 while directing a null towards MS_p_1.

The interference generated by BS_q at MS_p_1 is expressed below in either Equation (16a) if MS_q_2 is being served or Equation (16b) if MS_q_3 is being served. Also, the interference generated by BS_p at MS_q_2 or MS_q_3 is expressed below in either Equation (17a) or Equation (17b). These interference levels are lower than the levels associated with the grouping of FIG. 3A.

$$\left\| \vec{w}_{MS\_p\_1\_DL}^H H_{q\_p\_1}^{DL} \left( \frac{\vec{w}_{q\_2}^H}{\|\vec{w}_{q\_2}\|} \right)^T \right\|^2 \delta_{s\_q\_2}^2 \quad (16a)$$

$$\left\| \vec{w}_{MS\_p\_1\_DL}^H H_{q\_p\_1}^{DL} \left( \frac{\vec{w}_{q\_3}^H}{\|\vec{w}_{q\_3}\|} \right)^T \right\|^2 \delta_{s\_q\_3}^2 \quad (16b)$$

$$\left\| \vec{w}_{MS\_q\_2\_DL}^H H_{p\_q\_2}^{DL} \left( \frac{\vec{w}_{p\_1}^H}{\|\vec{w}_{p\_1}\|} \right)^T \right\|^2 \delta_{s\_p\_1}^2 \quad (17a)$$

$$\left\| \vec{w}_{MS\_q\_3\_DL}^H H_{p\_q\_3}^{DL} \left( \frac{\vec{w}_{p\_1}^H}{\|\vec{w}_{p\_1}\|} \right)^T \right\|^2 \delta_{s\_p\_1}^2 \quad (17b)$$

Thus, from the above analysis, embodiments provide for the grouping of mobile stations that will increase SIR levels, as expressed above in Equation (13). This may involve coordinated operations by multiple base stations. In turn, such increased SIR levels will contribute to a reduction in the interference term of Equation (11), which is again provided below in Expression (18).

$$\left\| \vec{w}_{MS\_p\_m\_DL}^H H_{q\_p\_m}^{DL} \left( \sum_{\substack{q=1 \\ p \neq q}}^{Q} \sum_{n=1}^{J} \frac{\vec{w}_{q\_n}^H}{\|\vec{w}_{q\_n}\|} \right)^T \right\|^2 \delta_{s\_q\_n}^2. \quad (18)$$

Figure 4A:
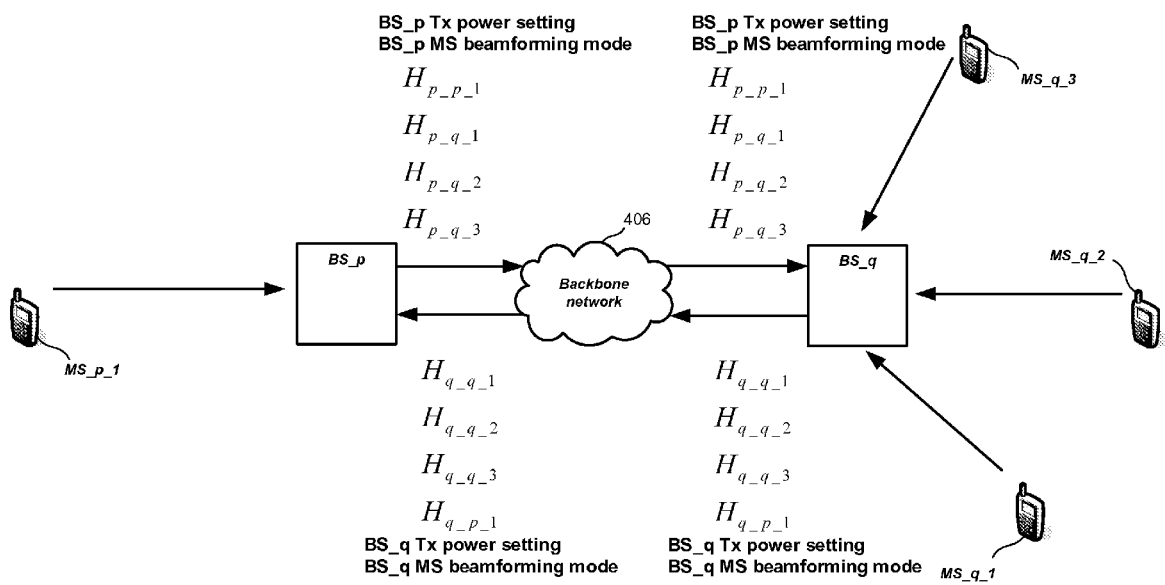
FIG. 4A is a diagram of an exemplary time division duplexing (TDD) system.
Figure 4B:
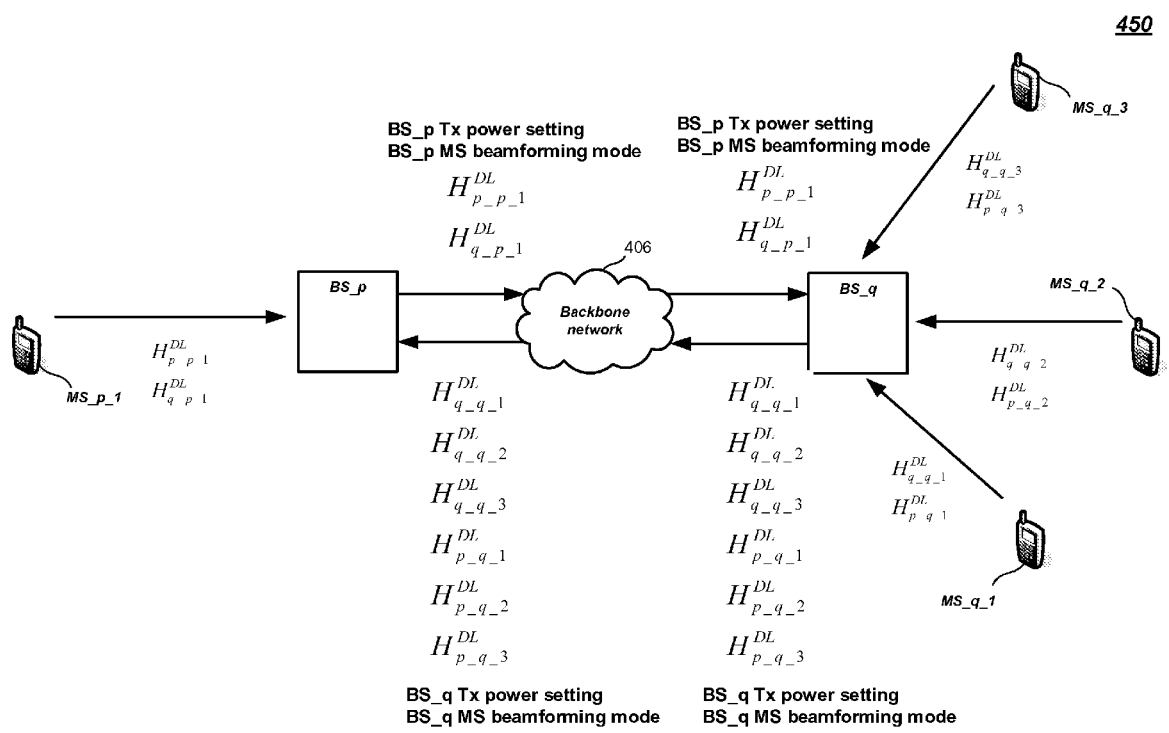
FIG. 4B is a diagram of an exemplary frequency division duplexing (FDD) system.

FIGS. 4A and 4B are diagrams of exemplary systems. In particular, FIG. 4A shows a system 400 that employs TDD transmission techniques for communications with mobile devices, while FIG. 4B shows a system 450 that employs FDD transmission techniques for communications with mobile devices. As show in these diagrams, each of these systems may include the elements of FIG. 1. These elements include base stations BS_p and BS_q, as well as mobile stations MS_p_1, MS_q_1, MS_q_2, and MS_q_3. In addition, each of these systems includes a backbone network 406.

The base stations of FIGS. 4A and 4B may be implemented in the manner described above with reference to FIG. 2. Also, the mobile stations of FIGS. 4A and 4B may be implemented in the manner described below with reference to FIG. 7. However, other implementations for these base stations and mobile stations may be employed.

FIGS. 4A and 4B show that BS_p and BS_q may be coupled by backbone network 406. Backbone network 406 may include one or more communications networks that allow these base stations to exchange information that they receive from their mobile stations. Such communications network(s) may be wired and/or wireless. Referring again to FIG. 2, BS_p and BS_q may each employ a corresponding backbone communications interface module 217 to communicate across backbone network 406. The embodiments, however, are not limited to this context.

As described above, BS_p and BS_q may exchange channel information (such as frequency response characteristics) across backbone network 406. For instance, BS_p and BS_q may exchange downlink interfering channel frequency response characteristics that they measure in TDD systems or receive from their mobile stations in FDD systems.

As an example, FIG. 4A shows an exchange of information between BS_p and BS_q over backbone network 406 for mobile station grouping purposes when TDD transmission techniques are employed. Note that during normal operation (when grouping operations are not being performed), no such information exchange is needed over backbone network 406 for TDD systems.

As described above, system 450 of FIG. 4B employs FDD transmission techniques. FIG. 4B shows an exchange of information between BS_p and BS_q over backbone network 406. In addition, FIG. 4B shows an exchange of information between serving base stations and their mobile stations. These exchanges are made for mobile station grouping purposes.

As shown in FIG. 4B, BS_p sends $H_{p\_p\_1}^{DL}, H_{q\_p\_1}^{DL}$ to BS_q. Also, FIG. 4B shows BS_q sending $H_{q\_q\_1}^{DL}$, $H_{q\_q\_2}^{DL}, H_{q\_q\_3}^{DL}, H_{p\_q\_1}^{DL}, H_{p\_q\_2}^{DL}, H_{p\_q\_3}^{DL}$ to BS_p.

Figure 5:
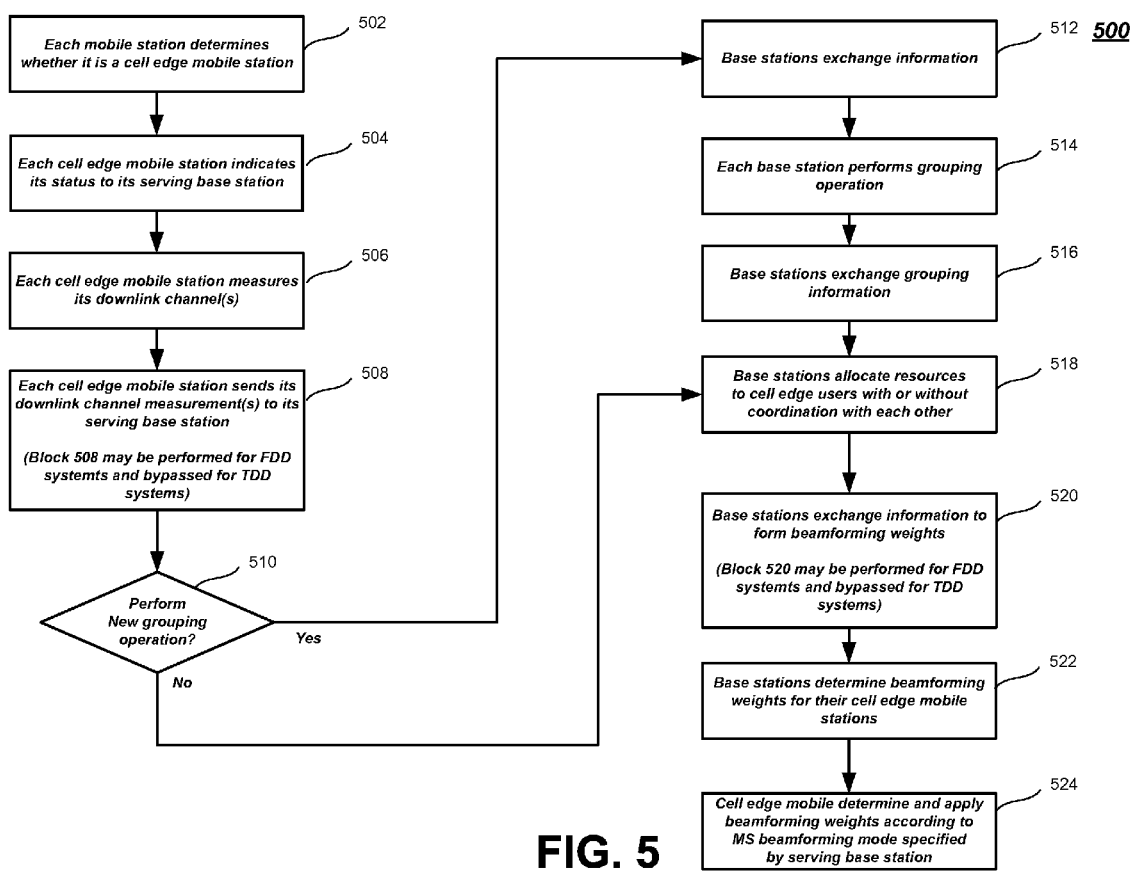
FIGS. 5 and 6 illustrate logic flow examples.

FIG. 5 illustrates one embodiment of a logic flow. In particular, FIG. 5 illustrates a logic flow 500, which may be representative of the operations executed by one or more embodiments described herein. Although FIG. 5 shows a particular sequence of operations, other sequences may be employed. Also, the depicted operations may be performed in various parallel and/or sequential combinations.

The operations of FIG. 5 are described in the context of an environment having multiple base stations. These base stations may each serve one or more mobile stations. Thus, this flow may be performed, for example, in the environment of FIG. 1 and/or the system of FIGS. 4A and 4B. The embodiments, however, are not limited to these exemplary contexts.

The flow of FIG. 5 includes a block 502. At this block, each mobile station determines whether it is a cell edge mobile station. Mobile stations may employ various techniques for determining cell edge status. Exemplary techniques are provided below with reference to FIG. 8.

At a block 504, each cell edge mobile station indicates its determined status to its serving base station. This may involve sending a message claiming cell edge mobile station status to the serving base station. For example, in the contexts of FIGS. 1, 4A, and 4B, MS_p_1 may indicate its cell edge status to BS_p. Similarly, MS_q_1, MS_q_2, and MS_q_3 may each indicate their cell edge status to BS_q. Such indications may be in the form of signaling messages that claim cell edge status. However, the embodiments are not limited to the employment of such messages.

At a block 506, each cell edge mobile station measures its downlink channels. This may include any downlink interfering channel(s) with other base station(s). Additionally, this may include its downlink user channel with its serving base station. In TDD systems, such downlink user channel measurements can be carried out. However, the cell edge mobile stations may refrain from sending these measurements to their serving base station.

At a block 508, each cell edge mobile station sends its measurement(s) of block 506 to its serving base station. These may be sent as one or more signaling messages. The embodiments, however, are not limited to this example. In embodiments employing TDD transmission techniques, block 508 may be bypassed. This is because base stations may derive such information from uplink channels.

The serving base stations will determine whether a new grouping operation is to be performed at a block 510. A new grouping operation may be performed for various reasons. Examples of such reasons include changes in channel conditions and/or changes in the distribution of cell edge users. The embodiments, however, are not limited to these examples. If it is determined that a new grouping operation is to be performed, then operations proceeds to a block 512. Otherwise operation may proceed to a block 518.

At block 512, the multiple base stations exchange information. For instance, each base station may send to one or more remote base stations (e.g., neighboring base stations) downlink interfering channel measurements for its cell edge mobile station(s). Also, each base station may send identifiers of its own cell edge mobile stations to the one or more remote base stations. Further, each base station may send downlink channel measurements between it and its cell edge mobile station(s). This exchange of information may occur across one or more backbone networks, such as backbone network 406. However, other networks may be employed.

Thus, at this point, each base station may possess information regarding multiple cell edge mobile stations. For instance, each base station may know the identity of its own cell edge mobile stations, as well as the identity of remotely served cell edge mobile stations. Also, each base station may possess measurements for downlink user channels with its own cell edge mobile stations. Additionally, each base station may possess measurements for its downlink interference channels between itself and the remotely served cell edge mobile stations, as well as measurements for the interference channels between its own cell edge users and other interfering base stations. Further, each base station may calculate the downlink beamforming weights employed by its own cell edge mobile stations, as well as the downlink beamforming weights employed by the remotely served cell edge mobile stations.

Based on such information, each base station may perform a grouping operation at a block 514. This operation identifies cell edge mobile stations that are suitable for sharing resource block allocations. An exemplary grouping procedure is described below with reference to FIG. 6. The results of these grouping operations are shared among the base stations in block 516.

Following the grouping procedure, resource allocation for cell edge mobile stations is performed at block 518 with and without base station coordination and information exchange. This may involve allocating each of one or more resource blocks to one or more cell edge mobile stations. For example, a resource block may be allocated to multiple cell edge mobile stations served by different base stations.

Based on this resource allocation, base stations exchange information for beamforming weight calculation in block 520 for FDD systems. Block 520 may be bypassed for TDD systems. Each base station may determine beamforming weights for its cell edge mobile stations at a block 522. As described above, these beamforming weights are represented as $\vec{w}_{p\_m}$, and employed as $$\frac{\vec{w}_{p\_m}}{\|\vec{w}_{p\_m}\|}$$

in the transmission of downlink signals. For TDD systems, $\vec{w}_{p\_m}$ may be calculated in accordance with Equations (3) and (4). However, for FDD systems, $\vec{w}_{p\_m}$ may be calculated in accordance with Equations (6) and (7).

At a block 524, each cell edge mobile stations may determine its beamforming weights, depending on the MS beamforming mode selected by its serving base station. Once determined, these weights may be applied.

As described above with reference to FIG. 5, base stations may perform grouping operations. During such operations, a base station may identify groups of one or more cell edge mobile stations. Each group includes a cell edge mobile station that is serviced by the base station. In addition, each group may include one or more cell edge mobile stations that are served by other base stations.

Figure 6:
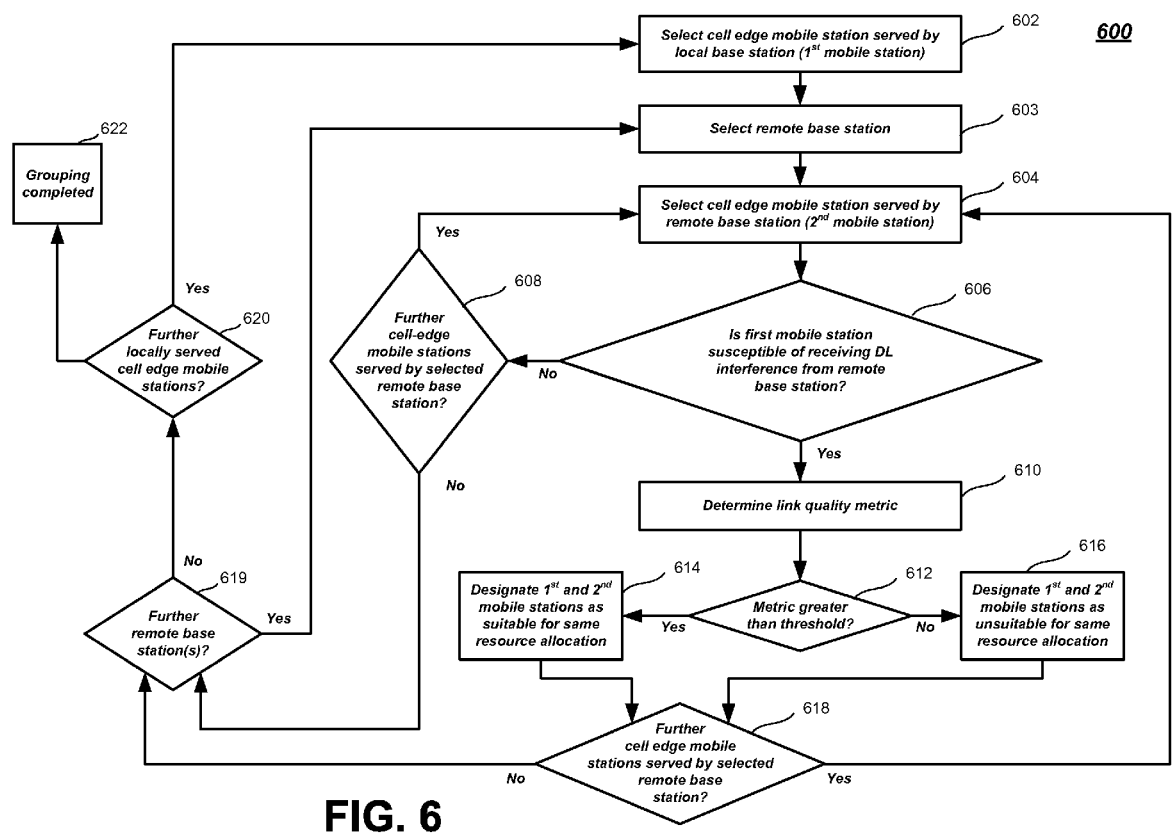

FIG. 6 is a flow diagram showing a logic flow 600 of an exemplary grouping procedure. In this procedure, a base station (referred to as the "local base station") identifies groups of cell edge mobile stations that are suitable for receiving downlink transmissions in the same resource block. More particularly, the local base station may identify a group for each of its cell edge mobile stations.

This logic flow is representative of operations executed by one or more embodiments described herein. Although FIG. 6 shows a particular sequence of operations, other sequences may be employed. Also, the depicted operations may be performed in various parallel and/or sequential combinations.

The logic flow of FIG. 6 includes a block 602. At this block, the local base station selects a cell edge mobile station that it serves (i.e., a "locally served" cell edge mobile station). This selected mobile station is referred to as the first mobile station. In the context of FIG. 1, block 602 may involve BS_p selecting MS_p_1 as the first mobile station.

At a block 603, the local base station selects a remote base station. This selection may be from a predetermined list of base stations. Such a list may include remote base stations that are likely to provide downlink interference to mobile stations served by the local base station. Additionally or alternatively, such a list may include remote base stations serving mobile stations that are likely to receive downlink interference from the local base station. Therefore, in embodiments, this list of base stations may include the local base station's neighboring base stations.

At a block 604, the local base station selects a cell edge mobile station served by the remote base station that was selected at block 603. This remotely served mobile station is referred to as the second mobile station. Referring again to FIG. 1 as an example, block 604 may involve BS_p selecting MS_q_1 (which is served by BS_q) as the second mobile station.

At a block 606, it is determined whether the first mobile station is susceptible of receiving downlink interference from the remote base station while it is serving the second mobile station. This may involve, for example, determining whether the first mobile station has reported a downlink interfering channel from the remote base station. The embodiments, however, are not limited to these examples.

FIG. 6 shows that if the first mobile station is susceptible to receiving such downlink interference, then operation proceeds from block 606 to a block 610. Otherwise, operation proceeds from block 606 to a block 608.

At block 608, it is determined whether the selected remote base station serves any further cell edge mobile stations. If so, then operation proceeds from block 608 to block 604, where another remotely served cell edge mobile station is selected as the second mobile station. Otherwise, operation proceeds to a block 619.

As stated above, operation may proceed from block 606 to block 610. This may occur when the first mobile station is susceptible of receiving downlink interference from the remote base stations.

At block 610, a quality metric is determined from the perspective of the first mobile device. In embodiments, the quality metric is based on a user link strength and an interfering link strength. For instance, the quality metric may provide a comparison (e.g., a ratio) between these strengths. The user link (which is associated with service of the first mobile station) is between the local base station and the first mobile station. The interfering link is between the selected remote base station and the first mobile station. However, the interfering link is associated with service of the second mobile station.

These link strengths may be based on channels between these devices, as well as on beamforming weights associated with the local and remote base stations. For instance, the user link may be based on a channel between the local base station and the first mobile station, and beamforming weight(s) calculated for the local base station to form a beam towards the first mobile station while forming a null towards the second mobile station. Also, the interfering link may be based on a channel between the remote base station and the first mobile station, as well as on beamforming weight(s) calculated by the remote base station to form a beam towards the second base station while forming a null towards the first mobile station. Thus metric may provide an evaluation in the context of only the first and second mobile stations.

The quality metric determined at block 610 may be in the form of a signal to interference ratio (SIR), as expressed below in Equation (19). Calculation of this SIR involves base station beamforming weights. Such weights may be determined by evaluating only the two mobile stations under consideration. In embodiments, these weights may be determined in accordance with Equations (3) and (4) or (6) and (7), above. However, other techniques may be employed.

The embodiments are not limited to employing this SIR ratio. Thus, other forms of quality metrics may be employed.

$$\frac{\left\|\vec{W}_{MS\_p\_m\_DL}^{H} H_{p\_p\_m}^{DL}\left(\frac{\vec{w}_{p\_m}^{H}}{\|\vec{w}_{p\_m}\|}\right)^{T}\right\|^{2} \delta_{s\_p\_m}^{2}}{\left\|\vec{W}_{MS\_p\_m\_DL}^{H} H_{q\_p\_m}^{DL}\left(\frac{\vec{w}_{q\_n}^{H}}{\|\vec{w}_{q\_n}\|}\right)^{T}\right\|^{2} \delta_{s\_q\_n}^{2}}. \tag{19}$$

FIG. 6 shows that, at a block 612, it is determined whether the metric exceeds a predetermined threshold. If so, then operation proceeds to a block 614. Otherwise, operation proceeds to a block 616.

At block 614, the first mobile station and the second mobile station are designated as being suitable for beamforming links in a same resource block by the local base station. Thus, these mobile stations are identified as being compatible for a same resource allocation.

In contrast, at block 616, the first mobile station and the second mobile station are designated as being unsuitable for beamforming links in a same resource block by the local base station. This condition is also referred to as being incompatible for a same resource allocation.

As indicated by a block 618, operation returns to block 604 if a further cell edge mobile station served by the remote base station exists. If not, then operation proceeds to a block 619.

At block 619, it is determined whether there are any further remote base stations to be considered. For instance, block 619 may determine whether there are further base stations to be considered in the aforementioned list of remote base stations. If such further remote base stations exist, then operation returns to block 603. Otherwise, operation proceeds to a block 620.

At block 620, it is determined whether the local base station serves any further cell edge mobile stations. If so, then operation returns to block 602. Otherwise, the grouping exercise at local base station is completed, as indicated by a block 622.

The operations of FIG. 6 identify groups of cell edge mobile stations that are suitable for being served together, as well as identify other cell edge mobile stations that are unsuitable for being served together. More particularly, for each cell edge mobile station served by the local base station, block 614 may identify a group of cell edge mobile stations that are suitable for the same resource block allocation.

Figure 7:
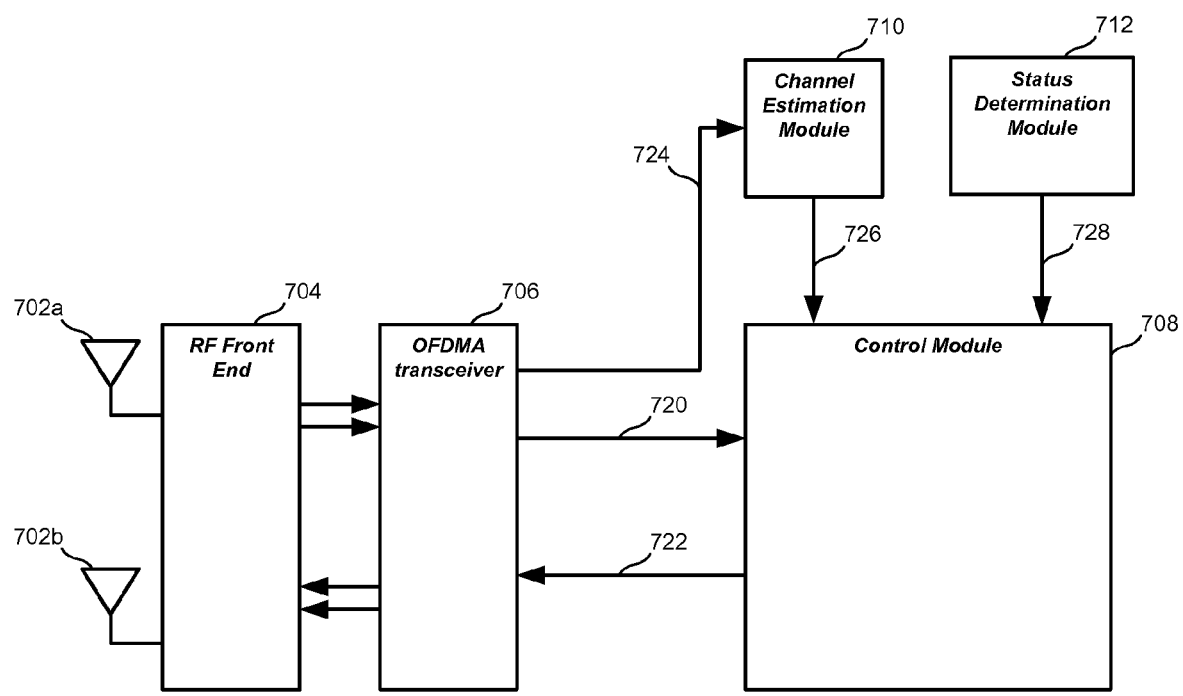
FIG. 7 is a diagram of an exemplary mobile station.

FIG. 7 is a diagram showing an implementation of an exemplary mobile station 700. This implementation may be employed for mobile stations described herein. The embodiments, however, are not limited to this implementation.

Mobile station 700 may include various elements. For instance, FIG. 7 shows mobile station 700 including antennas 702a-b, a radio frequency (RF) front end 704, an OFDMA transceiver 706, a control module 708, a channel estimation module 710, and a status determination module 712. These elements may be implemented in hardware, software, firmware, or any combination thereof.

For purposes of illustration (and not limitation), FIG. 7 shows mobile station 700 including two antennas (702a-b). However, any number of antennas may be employed. Through antennas 702a-b, mobile station 700 may communicate with a serving base station.

RF front end 704 exchanges signals between antennas 702a-b and OFDMA transceiver 706. In particular, RF front end 704 prepares modulated signals received from OFDMA transceiver 706 for wireless transmission, and prepares received RF signals for processing by OFDMA transceiver 706. RF front end 704 may include various components (e.g., electronics) such as amplifiers, filters, upconverters, downconverters, diplexers, and/or circulators. However, other types of components may be employed.

OFDMA transceiver 706 receives (from RF front end 704) a signal for each of antennas 702a-b. Upon receipt, OFDMA transceiver 706 may demodulate, combine (e.g., according to beamforming weights), and process these signals to produce a received information sequence 720. As shown in FIG. 7, information sequence 720 is sent to control module 708.

Also, OFDMA transceiver 706 receives (from control module 708) an information sequence 722. OFDMA transceiver 706 may process, modulate, and apply beamforming techniques to this sequence. As a result, OFDMA transceiver 706 produces a signal for each of antennas 702a-b. These signals are sent to RF front end 704, which prepares them for wireless transmission via antennas 702a-b.

In addition, OFDMA transceiver 706 provides received beamforming pilots 724 to channel estimation module 710. Beamforming pilots 724 (which are conveyed in wireless signals received by antennas 702a-b) may be sent by multiple base stations. These pilots may include subcarrier components arranged according to predetermined scheme(s). Thus, beamforming pilots 724 may include pilots corresponding to a downlink user channel, as well as pilots corresponding to downlink interfering channels (if any).

From beamforming pilots 724, channel estimation module 710 determines frequency responses for the downlink user channel, as well as frequency responses for any downlink interfering channels. In embodiments, such determinations may involve dividing received pilot subcarrier values with the predetermined (actual) pilot subcarrier values. Such determinations are sent to control module 708, as frequency response information 726.

FIG. 7 shows that status determination module 712 also receives beamforming pilots 724. From these pilots, status determination module 712 may determine whether mobile station 700 is a cell edge mobile station. If so, then status determination module 712 may generate a cell edge status message 728, which is sent to control module 708. Additionally or alternatively, status determination module 712 may determine whether mobile station 700 is a cell edge mobile station from downlink preambles that are received from base stations. Exemplary techniques for determining whether cell edge status exists are described below with reference to FIGS. 8 and 9.

As described above, control module 708 exchanges information sequences 720 and 722 with OFDMA transceiver 706. Thus, control module 708 may exchange information with its serving base station. Accordingly, control module 708 may include components and/or functionality to operate according to one or more protocol layers. Such protocol layers may provide features, such as packet encapsulation/decapsulation, error correction encoding/decoding, signaling, link protocols, and/or media access protocols. However, control module 708 may include other components and/or functionality. In turn, control module 708 may exchange information (e.g., payload data) with higher level protocols and/or application entities (not shown).

Moreover, control module 708 may include frequency response information 726 and/or cell edge status message 728 in information sequence 722. For instance, control module 708 may include this information in the form of one or more CQI messages.

As described above, the elements of mobile station 700 may be implemented in hardware, software, firmware, or any combination thereof. Thus, implementations may include one or more processors that execute instructions or control logic stored in a storage medium (e.g., memory). This storage medium may be implemented as described above with reference to FIG. 2. The instructions or control logic stored in the storage medium may provide features of one or more of the elements of mobile station 700. The embodiments, however, are not limited to such implementations.

Figure 8:
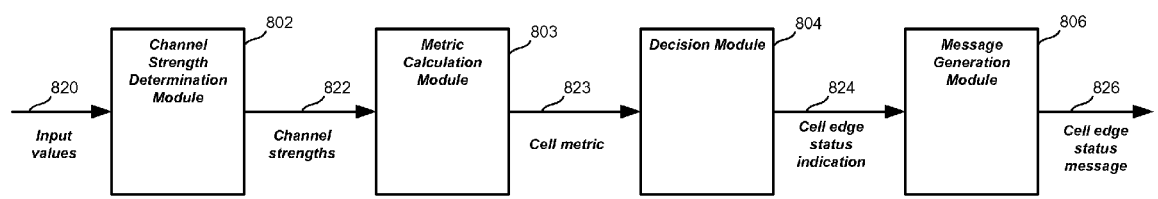
FIG. 8 is a diagram of an exemplary arrangement.

FIG. 8 is a diagram showing an exemplary arrangement 800 that may be included in status determination module 712. The embodiments, however, are not limited to this context. As shown in FIG. 8, arrangement 800 includes a channel strength determination module 802, a metric calculation module 803, a decision module 804, and a message generation module 806. These elements may be implemented in hardware, software, firmware, or any combination thereof.

FIG. 8 shows that channel strength determination module 802 receives input values 820. These values may be pilot signal values (e.g., values of beamforming pilots 724) or downlink preamble values. From these values, channel strength determination module 802 determines the strengths of one or more channels. Such channels include a user channel with a serving base station and any interfering channels (i.e., channels with non-serving base stations). Such strengths may be determined by dividing received pilot subcarrier values with predetermined (actual) subcarrier values. However, other techniques for determining channel strengths may be employed.

These strength(s), which are shown in FIG. 8 as channel strengths 822, are provided to metric calculation module 803, which calculates a cell metric 823 from these channel strengths. This may involve comparing the user channel strength to each of the interfering channel strengths (if any). As described below with reference to FIG. 9, this may involve calculating one or more ratios and selecting the smallest of these ratio(s).

Cell metric 823 is sent to decision module 804. Based on the value of this metric 823, decision module 804 determines whether one or more cell edge status conditions exist.

If one or more cell edge status condition(s) exist, then decision module 804 sends a cell edge status indication 824 to message generation module 806. Based on this indication, message generation module 806 generates a cell edge status message 826 that claims cell edge status. In the context of FIG. 7, this message may be implemented as cell edge status message 728. The embodiments, however, are not limited to this context.

Figure 9:
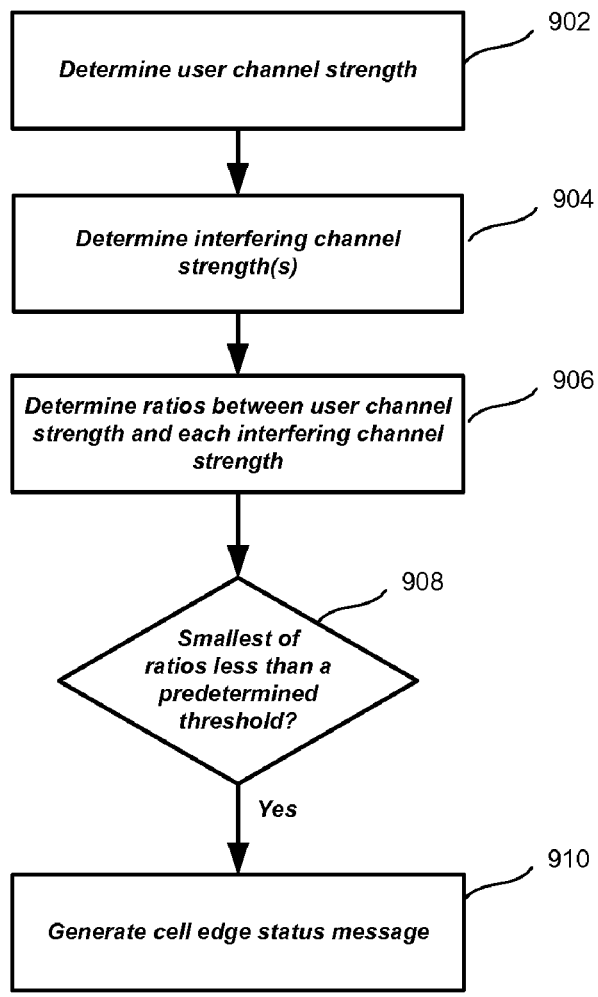
FIG. 9 illustrates an exemplary logic flow.

FIG. 9 illustrates a logic flow 900, which may be representative of operations executed by one or more embodiments, such as the arrangement of FIG. 8. Although FIG. 9 shows a particular sequence of operations, other sequences may be employed. Also, the depicted operations may be performed in various parallel and/or sequential combinations.

At a block 902, the strength of a user channel with a serving base station (also referred to as a user channel strength) is determined. Also, at a block 904, the strength of one or more interfering channels from non-serving base stations (also referred to as interfering channel strengths) are determined. In the context of FIG. 8, blocks 902 and 904 may be implemented by channel strength determination module 802.

These strengths may be determined from pilot signals or downlink preambles transmitted by the serving base station and the non-serving base station. For instance, such determinations may involve dividing the received pilot/preamble subcarrier values with predetermined (actual) subcarrier values. However, other techniques for determining channel strengths may be employed.

A cell metric is calculated at a block 906. For purposes of illustration (and not limitation) this metric is shown as the smallest of one or more ratios. Each ratio is between the user channel strength and a respective one of the interfering channel strengths. A block 908 determines whether one or more cell edge status conditions exist. For purposes of illustration, block 908 is shown determining whether the cell metric is less than a predetermined threshold. With reference to FIG. 8, blocks 906 and 908 may be implemented by metric calculation module 803 and decision module 804, respectively.

If block 908 determines that one or more cell edge status conditions exist, then operation proceeds to a block 910. At this block, a cell edge status message is generated. This message is sent to the serving base station. In the context of FIG. 8, block 910 may be implemented by message generation module 806.

Figure 10:
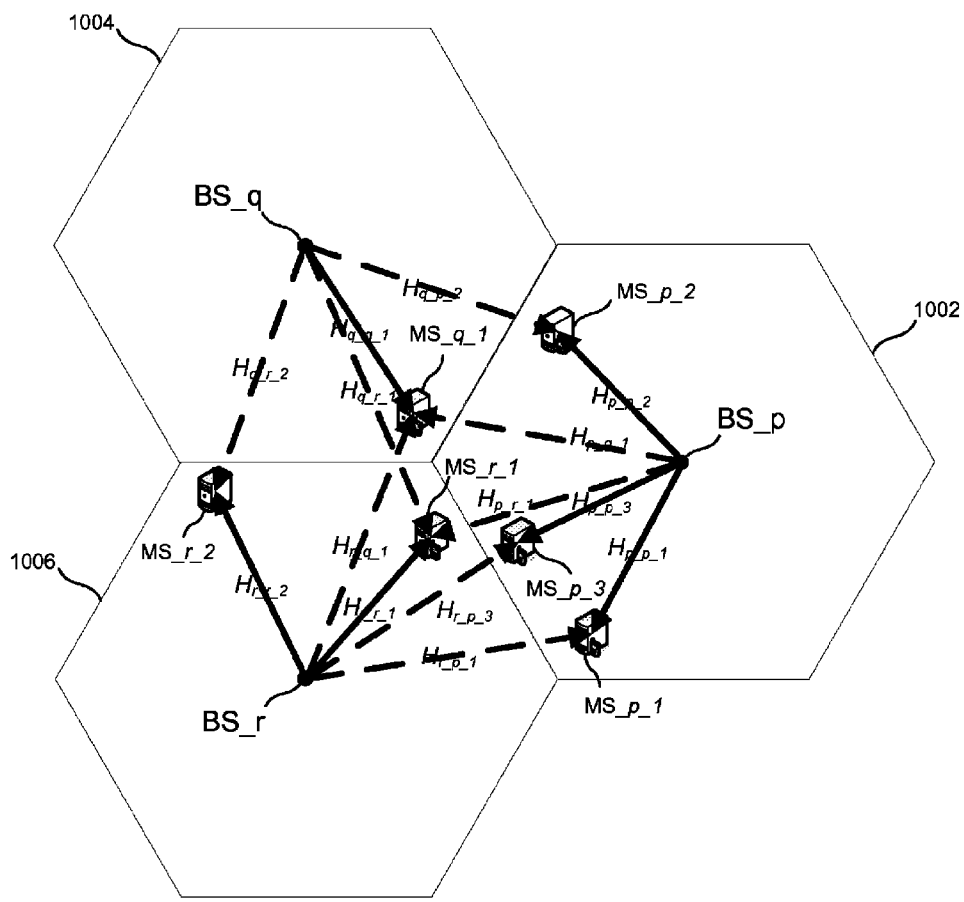
FIG. 10 is a diagram of an exemplary scenario.

FIG. 10 is a diagram illustrating a scenario 1000 involving three base stations. In particular, this scenario includes base stations BS_p, BS_q, and BS_r. BS_p provides a cell 1002, BS_q provides a cell 1004, and BS_r provides a cell 1006. Further, these base stations serve cell-edge mobile stations. In particular, BS_p serves mobile stations MS_p_1, MS_p_2, and MS_p_3. Further, BS_q serves mobile station MS_q_1. Finally, BS_r serves mobile stations MS_r_1 and MS_r_2.

In FIG. 10, solid lines indicate user channels between mobile stations with their serving base stations. Dotted lines indicate interfering channels between mobile stations and neighboring base stations. The scenario of FIG. 10 is provided for purposes of illustration, and not limitation.

An exemplary grouping procedure at BS_p is now described with reference to the scenario of FIG. 10.

At BS_p, the following information is available:
  Downlink channel information (e.g., frequency response characteristics) from BS_p to all its cell edge mobile stations which are measured by its mobile stations and fed back through CQI channels for FDD systems. This information is expressed as $H_{p\_p\_n}^{DL}$ where n can be 1, 2, 3. In TDD systems, this information is automatically available at BS_p through uplink signal measurement. This is because $H_{p\_p\_n} = (H_{p\_p\_n}^{DL})^T$.
  Downlink channel information (e.g., frequency response characteristics) from BS_p to mobile stations served by other base stations (BS_q and BS_r). This information may be obtained from other base stations (BS_q and BS_r) over backbone networks. This information is expressed as $H_{p\_q\_1}^{DL}$ and $H_{p\_r\_1}^{DL}$. Thus, through this information, BS_p realizes that it is an interference source for MS_q_1 and MS_r_1.
  Downlink interfering channel information from neighboring base stations (BS_q and BS_r) to BS_p cell edge mobile stations $H_{q\_p\_2}^{DL}$, $H_{r\_p\_3}^{DL}$ and $H_{r\_p\_1}^{DL}$. This channel may be measured by BS_p cell edge users.
  BS_p will send mobile station beamforming weights to neighboring base stations. For instance, BS_p may send $\vec{W}_{MS\_p\_2\_UL}$ to BS_q and send $\vec{W}_{MS\_p\_1\_UL}$, $\vec{W}_{MS\_p\_3\_UL}$ to BS_r.

For BS_p, its transmission to its cell edge mobile stations will be a source of interference for cell edge mobile stations (MS_r_1 and MS_q_1) served by BS_q and BS_r. Hence, the grouping exercise conducted by BS_p will only include its own cell edge mobile stations (MS_p_1, MS_p_2 and MS_p_3) and cell edge mobile stations (MS_r_1 and MS_q_1) served by BS_r and BS_q. The cell edge mobile stations (e.g., MS_r_2) served by BS_r that do not experience interference from BS_p are excluded from this grouping exercise. Thus, BS_q and BS_r can transmit to these MSs at any time without coordinating with BS_p.

Next, SIR at each of BS_p's cell edge user is considered in the context of BS_q and BS_r individually serving each of its cell edge MSs that can potentially generate interference at BS_p's cell edge users. With reference to FIG. 6, such SIRs may be link quality metrics of block 610. The embodiments, however, are not limited to this context.

These SIR calculations involve base station beamforming weights. Such weights may be determined by evaluating only the two mobile stations under consideration. In embodiments, these weights may be determined in accordance with Equations (3) and (4) or (6) and (7), above. However, other techniques may be employed.

First, MS_p_1 is considered. MS_p_1 can only experience interference from BS_r when BS_r serves MS_r_1 or MS_r_2. Hence, in this case, for MS_p_1, its grouping exercise involves only MS_r_1 and MS_r_2. When BS_p is transmitting to MS_p_1 and BS_r transmits to MS_r_1, the SIR at MS_p_1 is:

$$\frac{\left\| \vec{W}_{MS\_p\_1\_DL}^H H_{p\_p\_1}^{DL} \left( \frac{\vec{w}_{p\_1}^H}{\vec{w}_{p\_1}} \right)^T \right\|^2 \delta_{s\_p\_1}^2}{\left\| \vec{W}_{MS\_p\_1\_DL}^H H_{r\_p\_1}^{DL} \left( \frac{\vec{w}_{r\_1}^H}{\|\vec{w}_{r\_1}\|} \right)^T \right\|^2 \delta_{s\_r\_1}^2}.$$

When BS_p is transmitting to MS_p_1 and BS_r transmits to MS_r_2, the SIR at MS_p_1 is:

$$\frac{\left\| \vec{W}_{MS\_p\_1\_DL}^H H_{p\_p\_1}^{DL} \left( \frac{\vec{w}_{p\_1}^H}{\|\vec{w}_{r\_2}\|} \right)^T \right\|^2 \delta_{s\_p\_1}^2}{\left\| \vec{W}_{MS\_p\_1\_DL}^H H_{r\_p\_1}^{DL} \left( \frac{\vec{w}_{r\_2}^H}{\|\vec{w}_{r\_2}\|} \right)^T \right\|^2 \delta_{s\_r\_2}^2}.$$

Intuitively, BS_p shall be able to form a null towards MS_r_1 or MS_r_2 and a beam towards MS_p_1. Hence, the SIR ratio at MS_p_1 shall be high and BS_p can put MS_p_1, MS_r_1 and MS_r_2 into the same group.

Next, MS_p_2 is considered. MS_p_2 can experience interference from BS q when it serves MS_q_1. When BS_p is serving MS_p_2 and BS_q is serving MS_q_1, the SIR at MS_p_2 is:

$$\frac{\left\|\vec{w}_{MS\_p\_2\_DL}^{H} H_{p\_p\_2}^{DL}\left(\frac{\vec{w}_{p\_2}^{H}}{\|\vec{w}_{p\_2}\|}\right)^{T}\right\|^{2} \delta_{s\_p\_2}^{2}}{\left\|\vec{w}_{MS\_p\_2\_DL}^{H} H_{q\_p\_2}^{DL}\left(\frac{\vec{w}_{q\_1}^{H}}{\|\vec{w}_{q\_1}\|}\right)^{T}\right\|^{2} \delta_{s\_q\_1}^{2}}$$

This SIR shall be high. Hence, BS_p can put MS_q_1 into the same group as MS_p_2.

Finally, MS_p_3 is considered. MS_p_3 can only experience interference from BS_r when it serves MS_r_1 or MS_r_2. When BS_p is transmitting to MS_p_3 and BS_r transmits to MS_r_1, the SIR at MS_p_3 is:

$$\frac{\left\|\vec{w}_{MS\_p\_3\_DL}^{H} H_{p\_p\_3}^{DL}\left(\frac{\vec{w}_{p\_3}^{H}}{\|\vec{w}_{p\_3}\|}\right)^{T}\right\|^{2} \delta_{s\_p\_3}^{2}}{\left\|\vec{w}_{MS\_p\_3\_DL}^{H} H_{r\_p\_3}^{DL}\left(\frac{\vec{w}_{r\_1}^{H}}{\|\vec{w}_{r\_1}\|}\right)^{T}\right\|^{2} \delta_{s\_r\_1}^{2}}.$$

When BS_p is transmitting to MS_p_3 and BS_r transmits to MS_r_2, the SIR at MS_p_3 is:

$$\frac{\left\|\vec{w}_{MS\_p\_3\_DL}^{H} H_{p\_p\_3}^{DL}\left(\frac{\vec{w}_{p\_3}^{H}}{\|\vec{w}_{p\_3}\|}\right)^{T}\right\|^{2} \delta_{s\_p\_3}^{2}}{\left\|\vec{w}_{MS\_p\_3\_DL}^{H} H_{r\_p\_3}^{DL}\left(\frac{\vec{w}_{r\_2}^{H}}{\|\vec{w}_{r\_2}\|}\right)^{T}\right\|^{2} \delta_{s\_r\_2}^{2}}.$$

From an inspection of FIG. 10, it is intuitive that MS_r_1 lies in the beam directed from BS_p to MS_p_3. Hence, in this case, the SIR at MS_p_3 shall be low when BS_r is serving MS_r_1. However, BS_p shall be able to form a beam towards MS_p_3 and a null towards MS_r_2. Hence, BS_p can put MS_p_3 and MS_r_2 into the same group, while MS_r_1 will be in a different mobile station group.

Thus, through this grouping procedure, the following results are obtained:

MS_p_1 group includes MS_r_1 and MS_r_2;
MS_p_2 group includes MS_q_1;
MS_p_3 is in the same group as MS_r_2. However, MS_p_3 cannot be in the same group as MS_r_1.

Hence, at the end of this procedure, BS_p will convey to BS_r over a backbone network that they need to coordinate transmissions to MS_p_3 and MS_r_1 such that the transmissions will not happen simultaneously using the same resource block. Further, BS_p, BS_q, and BS_r may coordinate across the backbone network to determine resource allocations for their mobile stations. From this, the base stations may determine beamforming weights for each of their employed resource blocks.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

Thus, it should be understood that the various embodiments described herein have been presented by way of example only, and not in limitation. For instance, embodiments are not limited to WiMAX or WiMAX II implementations. Further, embodiments are not limited to implementations employing OFDM or OFDMA transmission techniques.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
   selecting a first cell edge mobile station, wherein the first mobile station is served by a first base station;
   selecting a second cell edge mobile station, wherein the second mobile station is served by a second base station;
   determining a quality metric based on a strength of a user link and a strength of an interfering link, the user link comprising a link between the first base station and the first mobile station, the interfering link comprising a link between the second base station and the first mobile station, wherein the user link is associated with service of the first mobile station and the interfering link is associated with service of the second mobile station;
   designating the first and second mobile stations as suitable for beamforming service in a same resource allocation when the quality metric is greater than a predetermined threshold.

2. The method of claim 1, further comprising:
   designating the first and second mobile stations as unsuitable for beamforming links in a same resource allocation when the determined ratio is less than the predetermined threshold.

3. The method of claim 1:
   wherein the strength of the user link is based on a channel between the first base station and the first mobile station, and on the beamforming weights associated with the first base station; and
   wherein the strength of the interfering link is based on a channel between the second base station and the first mobile station, and on the beamforming weights associated with the second base station.

4. The method of claim 1, wherein the quality metric is a ratio of the strength of the user link to the strength of the interfering link.

5. The method of claim 1, further comprising indicating the designation to the second base station.

6. The method of claim 1:
   wherein the second mobile station is susceptible to receiving interference from the first base station; and
   wherein the first mobile station is susceptible to receiving interference from the second base station.

7. The method of claim 1, further comprising:
   receiving a message from the first mobile station, the message claiming cell edge mobile station status.

8. The method of claim 1, further comprising:
   receiving a measurement of the downlink user channel from the first mobile station.

9. The method of claim 1, further comprising:
   receiving a measurement of the downlink interfering channel from a remote base station, wherein the remote base station serves the second mobile station.

10. An apparatus, comprising:
    a channel strength determination module to determine a user channel strength corresponding to a user channel from a serving base station, and to determine one or more interfering channel strengths, each interfering channel strength corresponding to an interfering channel from a non-serving base station;
    a metric calculation module to generate a cell metric from the user channel strength and the one or more interfering channel strengths;
    a decision module to select cell edge status when one or more cell edge status conditions exist; and
    a processor arranged to execute one or more of the channel strength determination module, metric calculation module or decision module.

11. The apparatus of claim 10, wherein the cell metric is the smallest of one or more ratios, each ratio between the user channel strength and one of the one or more interfering channel strengths.

12. The apparatus of claim 11, wherein the one or more cell edge status conditions includes the cell metric being below a predetermined threshold.

13. The apparatus of claim 10, further comprising a message generation module to generate a message claiming cell edge status.

14. The apparatus of claim 13, further comprising one or more antennas to wirelessly send the message to the serving base station.

15. The apparatus of claim 10, wherein the channel strength determination module is to determine the user channel strength and the one or more interfering channel strengths from beamforming pilots.

16. The apparatus of claim 10, wherein the channel strength determination module is to determine the user channel strength and the one or more interfering channel strengths from downlink preambles.

17. An article comprising a non-transitory computer-readable storage medium containing instructions that if executed enable a system to:
    determine a user channel strength corresponding to a user channel from a serving base station, and to determine one or more interfering channel strengths, each interfering channel strength corresponding to an interfering channel from a non-serving base station;
    generate a cell metric from the user channel strength and the one or more interfering channel strengths; and
    select cell edge status when one or more cell edge status conditions exist.

18. The article of claim 17, wherein the cell metric is the smallest of one or more ratios, each ratio between the user channel strength and one of the one or more interfering channel strengths.

19. The article of claim 18, wherein the one or more cell edge status conditions includes the cell metric being below a predetermined threshold.

* * * * *

UNITED STATES PATENT AND TRADEMARK OFFICE
CERTIFICATE OF CORRECTION

| | |
|---|---|
| PATENT NO. | : 8,150,399 B2 |
| APPLICATION NO. | : 11/963445 |
| DATED | : April 3, 2012 |
| INVENTOR(S) | : Wendy C. Wong et al. |

It is certified that error appears in the above-identified patent and that said Letters Patent is hereby corrected as shown below:

On the Title page, in field (57), in column 2, in "Abstract", line 2, after "example," delete "For instance".

On sheet 7 of 12, in Figure 5, Box. No. 508, line 5, delete "systemts" and insert -- systems --, therefor.

On sheet 7 of 12, in Figure 5, Box. No. 520, line 4, delete "systemts" and insert -- systems --, therefor.

Signed and Sealed this
Fifth Day of June, 2012

David J. Kappos
*Director of the United States Patent and Trademark Office*